United States Patent
Velasquez et al.

(10) Patent No.: US 9,429,000 B1
(45) Date of Patent: Aug. 30, 2016

(54) METHOD AND APPARATUS FOR DYNAMICALLY CONTROLLING WELL FLOW

(71) Applicant: PCS Ferguson, Frederick, CO (US)

(72) Inventors: Christopher A. Velasquez, Farmington, NM (US); Kori A. G. Hare, Bloomfield, NM (US)

(73) Assignee: PCS FERGUSON, Frederick, CO (US)

( * ) Notice: Subject to any disclaimer, the term of this patent is extended or adjusted under 35 U.S.C. 154(b) by 360 days.

(21) Appl. No.: 14/217,279

(22) Filed: Mar. 17, 2014

Related U.S. Application Data

(60) Provisional application No. 61/801,539, filed on Mar. 15, 2013.

(51) Int. Cl.
*E21B 43/12* (2006.01)
*E21B 47/00* (2012.01)

(52) U.S. Cl.
CPC .............. *E21B 43/12* (2013.01); *E21B 43/121* (2013.01); *E21B 47/0007* (2013.01)

(58) Field of Classification Search
CPC ...... E21B 43/12; E21B 43/121; E21B 34/60; E21B 34/14; E21B 43/00; E21B 47/0007; E21B 43/16; E21B 43/122; E21B 43/305; E21B 43/168; E21B 43/14; E21B 47/06
See application file for complete search history.

(56) References Cited

U.S. PATENT DOCUMENTS

| | | | | |
|---|---|---|---|---|
| 5,132,904 A | * | 7/1992 | Lamp | E21B 43/121 166/53 |
| 5,984,013 A | * | 11/1999 | Giacomino | E21B 43/121 166/373 |
| 6,241,014 B1 | * | 6/2001 | Majek | E21B 43/121 166/372 |
| 7,490,678 B2 | * | 2/2009 | Unruh | A01B 69/004 172/2 |
| 2008/0202746 A1 | * | 8/2008 | Mudry | E21B 43/121 166/250.15 |
| 2012/0318524 A1 | * | 12/2012 | Lea, Jr. | E21B 47/0007 166/372 |

* cited by examiner

*Primary Examiner* — Yong-Suk (Philip) Ro
(74) *Attorney, Agent, or Firm* — Marsh Fischmann & Breyfogle LLP

(57) ABSTRACT

A system comprising a well flow optimization program and associated control equipment for monitoring changing variables and well conditions and dynamically performing adjustments to one or more established set points. The system is designed to work with a plunger lift system but is also functional on a well that is not running a plunger lift or any type of artificial lift system. The system is also capable of controlling open flow and open flow set points and sales flow and sales flow set points by means of a pneumatic flow control device. The disclosed system also minimizes the time that is needed to optimize a well by a producer/operator.

10 Claims, 16 Drawing Sheets

METHOD AND APPARATUS FOR DYNAMICALLY CONTROLLING WELL FLOW

CROSS-REFERENCE TO RELATED APPLICATIONS

This application is a non-provisional application claiming the benefits of provisional application No. 61/801,539 filed Mar. 15, 2013, the disclosure of which is hereby incorporated by reference in its entirety.

FIELD OF ART

The disclosed device and method relate generally to a method of optimizing production of a well, and more specifically, to a method of monitoring and making dynamic adjustments to well control parameters based on changing conditions of a well during its production to achieve a continuous optimization thereof.

BACKGROUND

Well installation involves drilling a wellbore into a formation where oil, gas, and other natural resources and fluids may reside. This process generally involves preparing the bottom of the hole to the required specifications, installing production tubing and making a connection between the wellbore and the formation by means of perforation, thereby allowing for the flow of natural resources to enter the wellbore adjacent the bottom of the well.

As shown in FIG. 1, well installation 100 represents the assembly of valves, spools, and fittings used for a gas well that is installed on wellhead 120. Master valve 125 controls the flow of oil or gas from the well. Well installation 100 comprises tubing 140, casing 130. Well 100 is in hydraulic communication with reservoir 110 (see FIG. 2) by means of well perforations in casing 130. The void space between tubing 140 and casing 130 which is known as the annulus, allows for fluid movement in well 100. If the amount of pressure, in pounds per square inch (psi), located in formation 110 is higher than the pressure of flow line 165 (see also FIG. 2), the natural gases and fluids 115 are pushed out of formation 110 into casing 130. When the pressure in the annulus equals the pressure of formation 110, then natural gases and accumulated fluids 115 are pushed up tubing 140 creating a tubing pressure increase. Once tubing 140 is installed, wellhead 120 is installed on top of well 100 at surface 105 (ground level) of well 100. Wellhead 120 is said to be the main point of control of a well as it is used to stop or otherwise control the flow/production from a well.

FIG. 2 depicts a well installation in communication with associated surface or production equipment installations. When a well is drilled and completed, it becomes known as a "location" or a "lease". Surface equipment typically comprises a separator (production vessel) 180, one or more production tanks 195, 196, and a meter run via sales line 187. Separator 180 is connected to wellhead 100 by means of flow line 165. Once separator 180 is installed, it becomes the main point of control of a well.

Production fluid 185 in the form of fluids and gases is produced/pushed up from well 100 and collected in separator 180 where it undergoes a separation process. The gas portion is stored in separator 180 while the oil and water fractions are directed to oil storage tank 195 and water storage tank 196 via dump valves 190. Water storage tank 196 vents to atmosphere via vent 199.

Valve 175 (the "A valve" or sales valve) is installed at the end of separator 180 before gas flow/production enters sales line 187. An opening of valve 175 causes gases to flow into sales line 187 which serves as a meter run. The meter run is the point where the gas is measured and recorded while it is being sold into the pipeline, which can comprise miles and miles of pipe capable of collecting gases from a plurality of locations or leases for transfer to a refinery or processing plant before it is processed for sale to an end user. The meter run is also the point where line pressure is located.

Also depicted in FIG. 2 is a vent valve 275 (the "B valve") which is installed at separator 180 to allow gas flow/production to by-pass sales line 187 and be directed to water storage tank 196. Thus, when valve 175 or valve 275 are in the closed position, flow of gases and fluids from well 100 are blocked. Alternately, when one or the other is in the open position, the flow of gases and fluids is enabled. One or both of the valves may be manual or automatic based on the type of valves and equipment being used.

Many oil and gas companies, also known as producers or operators, install a controller or a programmable logic controller (PLC) 170 near separator 180 to control and optimize a well's production volumes. Controller 170 can be pre-programmed with a well operation algorithm and is capable of managing, analyzing, and/or controlling a variety of parameters affecting a well's performance; it can be employed to operate with a variety of devices, control mechanisms and programs.

For example, controller 170 can be used to control a well's production volume by means of an opening and/or closing of valves 175, 275. There are also some controllers that have the capability of controlling a well's flow rate (or production rate) by feathering (opening and closing) valve 175. Flow control can be performed by implementing an electronic or pneumatic device such as an "I/P" device, which converts current into pneumatic pressure, that is attachable to valve 175 or valve 275 to control the pertinent valve. For example; assume a well operator does not want a well to flow over a certain production rate. The system's controller could then be programmed such that it, along with an associated I/P, would only allow valve 175 to open up enough to stay at or below the production rate that is programmed into the controller. As the energy of the well drops, the production rate also drops in the example above. The controller working in conjunction with the I/P would then allow valve 175 to open up further to try to match the production rate that is programmed into the controller. There are a wide variety of controllers and programs that are available for producers/operators to use. Usually each of these controllers or programs is specific to a certain function or operation of a well.

Throughout a well's lifetime, the well will gradually deplete in terms of production. A well's annulus pressure (the pressure of the total casing) will decrease due to the length of time the well is required to produce and because gases and fluids develop in the pipeline over the years. Since fluid and/or water are heavier than gas, the influx of fluid and/or water into the wellbore can have a serious impact on a well's production rate. If a well accumulates too much fluid and/or water in its well bore, then the weight of the fluid and/or water will push back onto the formation associated with the well, restricting the flow of gas into the wellbore. This will in turn lower the annulus pressure. When there is a lower annulus pressure and more fluid and/or water accumulation in the wellbore, it will eventually come to a point where the well can no longer produce on its own. At this stage, some form of artificial lift is implemented to purge the well of accumulated fluid. A variety of artificial lift devices and equipment are available. One of the most common is plunger lift.

In operation, a freely movable plunger 150 (see FIG. 1) is disposed within tubing 140 in well 100 and is capable of traveling vertically in tubing 140 as well 100 is cycled between shut-in and open conditions. Plunger 150 may be manufactured in many designs and configurations. A particular plunger is selected based on the relevant situation. When a well is off or "shut-in" (no production), plunger 150 drops down from lubricator 160 into tubing 140 until it reaches the end thereof. Well 100 will be shut in for an amount of time as determined by controller 170 so as to hinder the flow of formation fluid 113 from the well and thereby allow the well to build up its casing and tubing pressure to overcome line pressure and to achieve a differential pressure. As a result, formation fluid 113 accumulates in casing 130 above plunger 150 and the pressure in tubing 140 and casing 130 builds up. When a predetermined time or predetermined tubing and/or casing pressure is achieved signifying that the well is ready to produce (turn on), valve 175 is opened and formation fluid 113 is allowed to flow in an upward direction. When this happens plunger 150 begins to travel up tubing 140 from the bottom of the well, bringing fluid 115 out of the well so it may enter separator 180 and into production tanks 195, 196.

When plunger 150 arrives in wellhead 120 from the bottom of tubing 140, it may be detected by a type of magnetic switch known a plunger arrival sensor (not shown) which is housed in lubricator 160 (see FIG. 1), which may also comprise a plunger auto catching device (not shown). The sensing device may be configured to send a signal to a surface controller upon arrival of plunger 150. Conduit 165 is an initial component of the overall "sales line". However, for purposes of convenience, conduit 165 will be referred to herein as the "flow line" and conduit 187 (see. FIG. 2) will be referred to the "sales line".

A plunger lift system is typically operated by a controller. Not only can the controller run the plunger lift system, it can simultaneously help operate the well. Many controllers comprise preloaded systems having a variety of settings that let the controller know how to operate the well. For example, a controller can be useful for alerting the system to turn the well on and off which starts and stops the well's production. The most common of these preloadable settings are time-based settings which may comprise an "A-Open" or open mode, a "B-Open" or vent mode, a "Closed" or off mode, a "Fall-Time" or minimum off-time mode and a "Sales" or delay time mode. Where the term "A-Open" appears, it should be recognized that the term will also refer to an open mode. Similarly, a "B-Open" reference will refer to a vent mode; a "Closed" reference will refer to an off mode; "Fall-Time" means a minimum off-time mode and a "Sales" means a delay time mode.

The "A-Open" mode (see FIG. 3, Mode 200) is the mode which the system first enters when the system is signaled to begin producing the well and is usually set to have a specified time setting. In this mode, the disclosed system signals the controller to activate a valve control mechanism to open valve 175. Mode 200 designates the amount of time that the system allows for the plunger to rise to the surface of the well from the bottom of the tubing 140 string. If the plunger fails to arrive in this amount of time then the system typically enters a "B-Open" mode (Mode 600) during which the controller opens valve 275 and begins flowing the well's gases and fluids straight into tank 196. The pressure inside of tank 196 is usually lower than the line pressure (pressure in line 187) thus the force from the line on the formation associated with the well is reduced, allowing for an easier plunger travel up tubing 140.

Once the plunger arrives at lubricator 160, where it is sensed by plunger arrival sensor 161, the system will usually enter a "Sales" mode (Mode 500). When the system enters this mode, the controller closes all valves except for valve 175. The well then produces (flows) for the amount of time designated in Mode 500. When Mode 500 has ended, the system enters a "Closed" mode (Mode 800). In Mode 800, the controller communicates a signal for all valves to close which allows plunger 150 to fall to the end of tubing 140 thereby allowing the well to build up pressure to be ready for another cycle beginning with Mode 200. Some systems also have a "Fall-Time" mode (Mode 800) where the system is shut-in for a minimum amount of time to make sure that all valves are closed for a specific amount of time. The purpose of this mode is to ensure that plunger 150 has sufficient time to make it all the way to the bottom of tubing 140 to ensure an efficient plunger travel prior to the next cycle. It is contemplated that the "Fall-Time" mode (Mode 800) can be designed so it cannot be overridden.

Many plunger lift systems may also have a wide variety of pressure-based settings that are set into the methodology, including but not limited to, a "Differential Open" set point, a "High Line Pressure" set point and a "Low Line Pressure" set point. The "Differential Open" set point ensures that the system does not allow the controller to open any valves until a designated pressure differential is met. The pressure differential can be a value representing a casing pressure minus tubing pressure, or a tubing pressure minus line pressure, or a casing pressure minus line pressure. In one example; the system contemplates a "Differential Open" set point of 50 psi. If the system is operating in a casing pressure minus line pressure mode, where the casing pressure is 120 psi and the line pressure is 90 psi, the system will not allow the controller to go into Mode 200 because the casing pressure has not met the set point of 50 psi. On the other hand, if the casing pressure is 120 psi and the line pressure is 60 psi, the system would go into Mode 200 and allow the controller to open valve 175 because the designated pressure differential set point has been met.

As stated above, the system can also be implemented using pressure-based settings. A "High Line Pressure" set point is such a pressure-based setting. In the disclosed system, line pressure can be continuously monitored if desired. When the line pressure increases over the set point, triggering a "high" line pressure reading, the system signals the controller to close all valves until line pressure decreases to normal operation. The "Low Line Pressure" setting works in the same manner. As an example, the system contemplates having a "Low Line Pressure" setting of 25 psi. If the line pressure is 100 psi, for example, then the system will continue to operate normally. If the line pressure is, for example, 20 psi, the system will keep the well shut-in until line pressure rises above the designated setting of 25 psi.

Generally, controller manufactures utilize their own custom programs. Those systems are usually specific to the relevant controller and/or the type of artificial lift system that is currently in use on the well. As stated above, one of the most common types of artificial lift systems comprises a plunger lift system. Therefore, it is not uncommon that each individual well will utilize a controller and/or program that differs from that of an adjacent well. In addition, it is not uncommon that each individual well could utilize a plunger that differs from that of an adjacent well. In short, there is a high level of incongruity between wells and the associated plunger lift equipment and controllers. In addition to the above, the problem with trying to optimize a well is that it is very difficult to have a methodology that accounts for every condition that can occur on a well since many conditions are dynamic in that they are usually constantly changing.

When a well that is configured with a plunger lift/artificial lift system is being operated to its full potential, it is said to be "optimized". Many different companies including plunger lift equipment and controller manufacturers have tried to build and design the "perfect" plunger lift operation system with a goal to optimize a well's production. Conventional systems will usually analyze a well's casing, tubing, and line pressure to determine a specific differential pressure setting to trigger turning the well on. Conventional programs will also monitor the well's production rate (or flow rate) to determine what flow rate would be best to shut the well in with, whether to make another cycle with the plunger or use another type of artificial lift system and whether to unload more fluid from the well to help optimize the well's production. There are many manufacturers with systems on the market today who claim that each can optimize a well's production. The disclosed device provides for a system and method to continuously monitor a well's production as well as its characteristics and make dynamic adjustments to its changing conditions for optimum production.

Although the disclosed system uses some of the most commonly used time-based and pressure-based options and features that are in many of the conventional programs, the system disclosed herein provides a method for applying those options and features so as to strive for continuous optimization of a well's production volume according to the well's constantly changing characteristics. The disclosed system also helps to minimize the time that is needed to optimize a well by a producer/operator. It is contemplated that the improved flow program disclosed herein can be loaded or written into any controller and can be used to retrofit existing systems.

SUMMARY OF THE DISCLOSURE

One aspect of the disclosed system is to dynamically control well flow in a production well.

Another aspect of the disclosed system is to optimize a well's production/flow rates with an improved flow control program.

Another aspect of the disclosed system is to dynamically monitor a well's changing characteristics during production and make necessary flow adjustments.

Yet another aspect of the disclosed system is to monitor the changing characteristics of a well which incorporates plunger lift technology and make necessary flow adjustments.

Another aspect of the disclosed system is to monitor the changing characteristics of a well which incorporates artificial lift technology and make necessary flow adjustments.

Another aspect of the disclosed system is to monitor and optimize a well's production in a well which does not incorporate artificial lift technology to simulate a plunger/fluid load arrival.

In wells having an I/P device, an aspect of the disclosed system is to control flow by means of said I/P device.

Another aspect of the disclosed system is to monitor and optimize a well's production in a well which does not incorporate artificial lift technology to simulate a plunger/fluid load arrival.

Another aspect of the disclosed system is that the improved flow program can be loaded or written into any controller/PLC, e.g. the PCS 4000 controller.

Another aspect of the system is the ability to use time-based and pressure-based measurements known in the conventional art and apply a methodology that uses said measurements to provide a continuous adjustment to the control of a well.

Another aspect of the system is the ability to adjust set points based on multiple plunger/fluid load arrival conditions.

Another aspect of the disclosed system is the ability to detect the presence of a fluid load without any special equipment or devices.

Yet another aspect of the system is the ability to control a well's flow/production rate at two different times using two separate flow rate set points.

Another aspect of the disclosed system is the ability to achieve a well's optimized "Differential Open" pressure and optimized fluid load.

Another aspect of the disclosed system is the ability to achieve a well's optimum critical flow/velocity rate.

Another aspect of the disclosed system is the ability to achieve a well's optimum or desired plunger travel speeds.

Another aspect of the disclosed system is the ability to minimize the time needed to optimize a well by a producer/operator.

Another aspect of the disclosed system is the ability to minimize damage to the associated plunger lift and surface equipment.

Yet another aspect of the disclosed system is to provide a longer, but controlled, flow rate producing more volume.

These and other advantages of the disclosed device will appear from the following description and/or appended claims, reference being made to the accompanying drawings that form a part of this specification wherein like reference characters designate corresponding parts in the several views.

Figure 1:
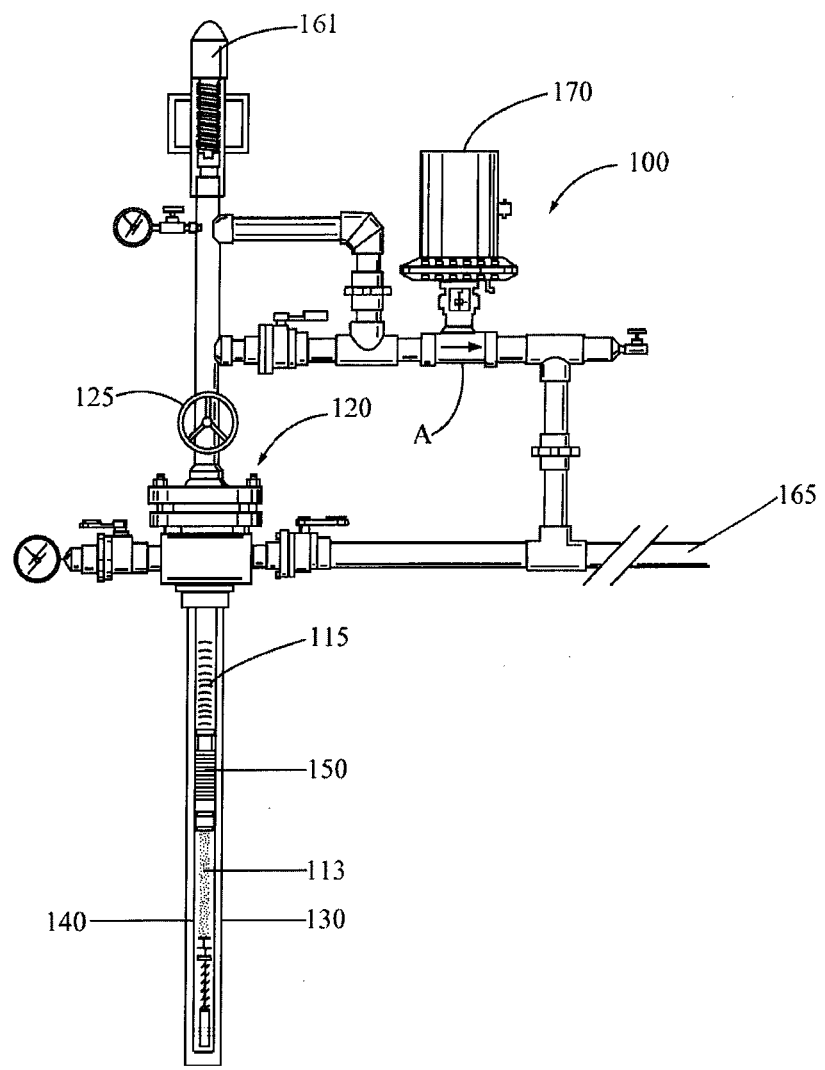
FIG. 1 (prior art) depicts a well installation for a plunger lift system.
Figure 2:
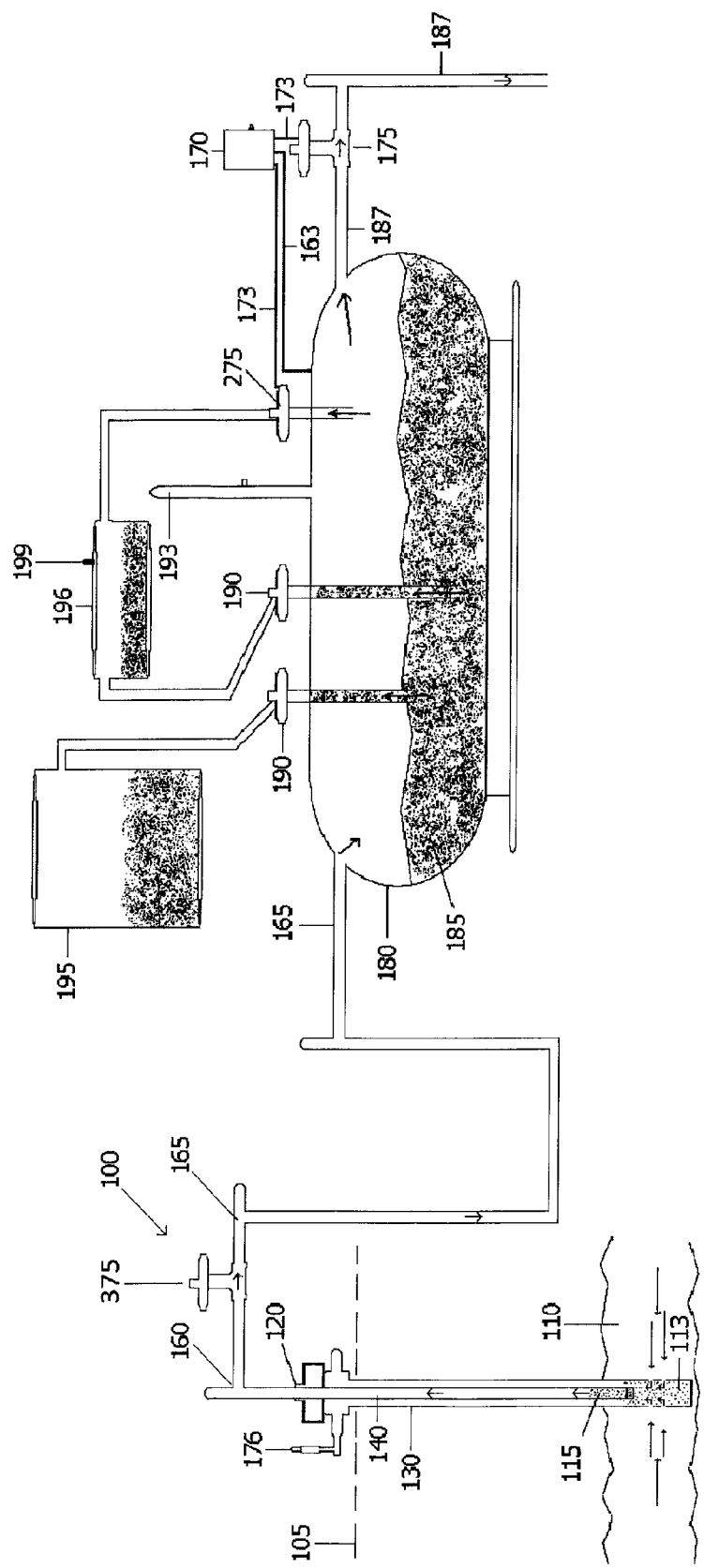
FIG. 2 (prior art) depicts an example of a well and associated surface equipment and production installations.

Before explaining the disclosed embodiments of the disclosed device in detail, it is to be understood that the device is not limited in its application to the details of the particular arrangements shown, since the device is capable of other embodiments. Also, the terminology used herein is for the purpose of description and not of limitation.

DESCRIPTION OF THE DISCLOSED EMBODIMENTS

The following description is provided to enable any person skilled in the art to make and use the disclosed apparatus. Various modifications, however, will remain readily apparent to those skilled in the art, since the generic principles of the present apparatus have been defined herein specifically to provide for an understanding of the disclosed system, a method and apparatus for dynamically controlling well flow.

The disclosed system works off of many different modes and set points. Modes and set points can be a value of time, pressure, pressure differential, a flow rate, or a percentage. Set points are usually user programmable settings that can be manually programmed into the disclosed system by an operator/producer. Most, if not all modes, could have a set point value. The disclosed system also works off of different on and off triggers. Triggers are set points that are usually user programmable and serve to communicate to the disclosed system which values should be populated before allowing the disclosed system to advance from one mode to another, or subsequent, mode.

FIGS. 3-16 diagrammatically describe the disclosed system by illustrating methods and features used by conventional plunger lift control systems. Typical adjustment options for the disclosed system with respect to increasing or decreasing parameters are as follows:

| PARAMETER | APPROXIMATE RANGE |
|---|---|
| Critical Flow (K) | 0-100,000 for K |
| Sales Low Flow | 0-100,000 MCF |
| Differential Open Pressure | 0-5,000 psi |
| Optimization Counter | 0-50 Numerical Count |
| Fluid Load Set Point | 0-5,000 0 MCF |
| Target Open Flow Rate Set Point | 0-5,000 MCF |
| Target Sales Flow Rate Set Point | 0-5,000 MCF |
| Fall-Time (Minimum Off-Time) Set Point | 0-1,440 min |
| Sales Time (After-Flow Time Set Point | 0-1,440 min |
| Max Avg. Travel Speed Set Point | 0-5,000 fpm |
| Min Avg. Travel Speed Set Point | 0-5,000 fpm |

A discussion of modes and set points for the disclosed system continues as follows:

1. Multiple Trigger Adjustments: The disclosed system has the ability to adjust or maintain one or more of its programmed set points based on more than just a digital switch or plunger arrival switch like most of the known systems. For example, the disclosed system utilizes travel speeds, flow rates and differential pressures as triggers to adjust its programmed set points.

2. Flow Rate Increase Setting: By establishing a "Flow Rate Increase" setting, the disclosed system has the ability to simulate a plunger (or fluid) arrival without the need for the installation of a plunger arrival sensor or a plunger lift system, which provides for more versatility and more efficient well control. The system utilizes a Flow Rate Increase setting to monitor a well's flow rate and then calculates the difference between the lowest flow rate detected in an "A-Open" mode after the disclosed system counts down the time allotted for "Electronic Flow Measurement (EFM) Flow Increase Delay" (or "Flow Increase Delay") and the highest flow rate reading. The "Flow Increase Delay" begins directly after the "EFM Open Delay Time" timeout has occurred which begins when the disclosed system enters an "A-Open" mode. If the difference is greater than the Flow Rate Increase setting, the disclosed system simulates a plunger/fluid arrival, attributing the increase in flow rate is due to removal of fluid in the tubing (no longer restricting production). Assume "Flow Rate Increase" is set at 100 MCF. When the system enters into an "A-Open" mode, the disclosed system will begin monitoring the well's flow rate. If the flow rate increases up to 400 MCF and then decreases down to 250 MCF and then increases up to 425 MCF while the system is in the "A-Open" mode, the disclosed system will automatically assume or simulate a plunger/fluid arrival. In the example above, the difference of the lowest flow value and the highest flow value during the "A-Open" mode is a value of 175 MCF, which is greater than the 100 MCF setting for "Flow Rate Increase". The Flow Rate Increase setting may also be measured by monitoring the well's tubing pressure instead of the well's flow rate.

The Flow Rate Increase setting also provides that if a flow rate increase is detected during an "A-Open" mode, the disclosed system will acknowledge the plunger/fluid arrival at the point when the flow rate increase was detected. The disclosed system will go into an "EFM Sales/Delay" mode and make the necessary adjustments to the system's settings as specified by system requirements. In addition, the system will adjust multiple settings based on the speed of the plunger/fluid from the speed at which the disclosed system detected the flow rate increase. During this entire process, the system will continue to monitor for a high line pressure and a low line pressure set point.

3. Ability to control two separate flow control set points: The disclosed system also has the ability to have two separate flow control set points. These set points are "Target Flow Rate During Open" mode and "Target Flow Rate During Sales" mode. Flow control is controlled by an I/P or some other type of pneumatic device that feathers the A valve in an open or closed position accordingly. Thus the control of the flow rate of the well is accomplished by opening or closing the A valve. In the "A Open" mode, the plunger/fluid load is traveling up the tubing string into the wellhead. If the plunger/fluid load speed is too fast, it can cause damage to the plunger and/or the wellhead itself, which can pose a serious safety hazard.

By controlling the flow rate of a well in the "Sales/Delay" mode, the disclosed system has the ability to control the fluid influx that is coming into the wellbore. The higher the well's velocity, the faster the well's casing pressure decreases which relieves the annulus pressure of the well quicker and allows for the flow of fluids and gas to come into the wellbore from the formation more quickly. If there is more fluid than gas (greater fluid to gas ratio) coming into the well bore, then it may be necessary to control the fluid influx into the wellbore by decreasing the target flow rate to slow down the velocity of the well. The disclosed system does this by monitoring the flow rate of the well during the "A-Open" mode after the "EFM Flow Increase Delay" is counted down. Once the "EFM Flow Increase Delay" time is counted down, the disclosed system will then begin monitoring the well's flow rate. If the well's flow rate is equal to or higher than the "Target Flow Rate During Open Mode", the disclosed system will begin controlling the well's flow rate using the I/P flow control device to achieve the desired "Target Flow Rate During Open Mode".

During the "A-Open" mode the disclosed system is also monitoring for a plunger/fluid load arrival signal, which may be a digital switch input on the controller or a casing pressure drop or a flow rate increase. Once one of these signals is detected by the disclosed system, the disclosed system will then go into a "Sales/Delay" mode. While the disclosed system is in Sales/Delay mode it monitors the flow rate of the well. If the flow rate of the well is equal to or higher than the "Target Flow Rate During Sales" mode, the disclosed system will begin controlling the well's flow rate using the I/P flow control device to achieve the desired flow rate that is set for "Target Flow Rate During Sales Mode".

4. Fluid Load: One of the chief functions of the disclosed system is its ability to detect a fluid load. The fluid load is the amount of fluid that is contained in the tubing. The disclosed system detects the fluid load by monitoring the well's flow rate during the "A-Open" after the "EFM Flow Increase Delay" time expires. The "EFM Flow Increase Delay" time begins immediately when the disclosed system enters the "A-Open" Mode. If the difference between the lowest flow rate reading and the highest flow rate reading during the "A-Open" mode is greater than the Fluid Load set point then the disclosed system will acknowledge that there was a Fluid Load.

The disclosed system works not only to optimize a medium or strong flow well, but also optimizes a weak well. In such cases, it will allow a longer, but controlled, flow rate producing more volume. Instead of letting a weak well vent its gases quickly and possibly draw liquids quickly to inhibit its flow, the disclosed system will use the flow control settings (and an I/P valve) for a controlled flow.

DETAILED DESCRIPTION OF THE DRAWINGS

Figure 3:
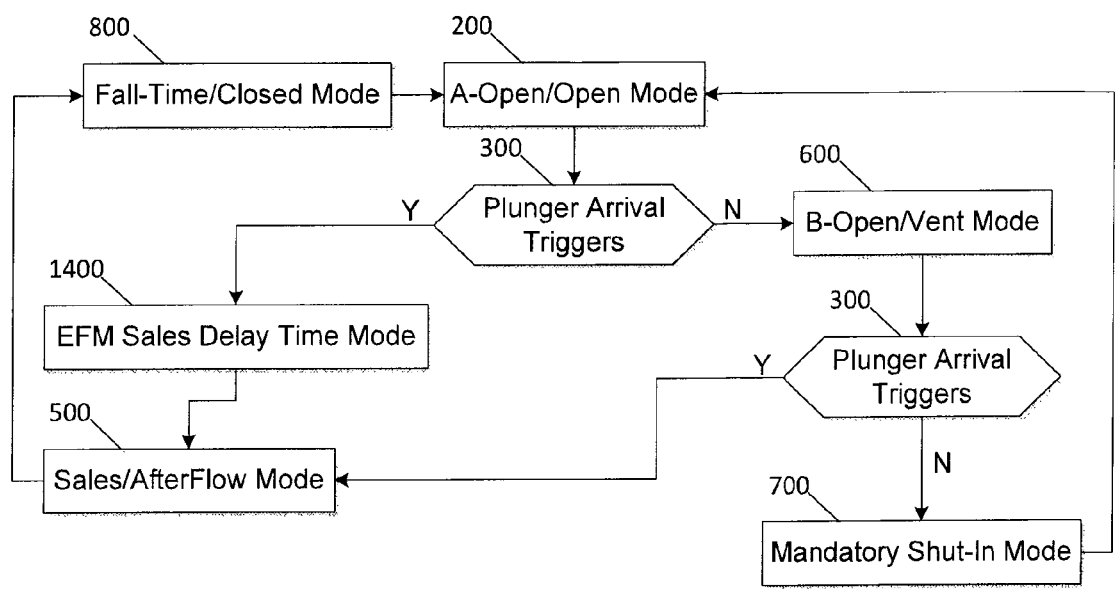
FIG. 3 is an overview of the disclosed method and apparatus.

FIG. 3 depicts an overview of the disclosed process 1000. Additional details regarding Fall-Time Mode 800 can be found in FIG. 4. Additional details regarding A-Open Mode 200 and B-Open Mode 600 can be found in FIGS. 4, 5, 6, 7, 14. Additional details regarding EFM Flow Sales Delay Time Mode 1400 can be found in FIGS. 8-12. Additional details regarding Sales/After Flow Mode 500 and Mandatory Shut-In Mode 700 can be found in FIGS. 13, 14, 15 respectively.

During Mode 800, the well is closed or shut-in (not flowing or producing) for a minimum time period. This ensures that the plunger/artificial lift device has made it completely to the bottom of the tubing string. The reason for this procedure is to ensure an on-bottom location of the plunger/artificial lift device. If the plunger/artificial lift device does not make it completely to the bottom of the tubing string, then during the next open cycle the plunger/artificial lift device may not completely remove all of the fluid load that may still be underneath said device. Mode 800 is designed such that no signal or action may take the disclosed system out of the mandatory time period. The system may, however, be manually activated to enter an "A-Open" (Mode 200) if desired. If there is a positive plunger arrival trigger 300 during Mode 200, then the disclosed system goes into EFM Sales Delay Time Mode 1400. Mode 1400 designates an amount of time for system stabilization prior to monitoring any parameters. Mode 1400 can be set for a time period in the range of about 30 to about 90 seconds. The disclosed system then goes into Sales/After Flow Mode 500. The system can stay in this mode until a fluid load inhibits flow or until any timeout is triggered.

If, on the other hand, there is no Plunger Arrival Trigger 300, then the disclosed system enters the B-Open/Vent Mode 600 whereby valve 275 is opened as previously described. If the plunger still fails to arrive then the disclosed system goes into the Mandatory Shut-In Mode 700. If Plunger Arrival 300 is positive during the B-Open/Vent Mode 600, the disclosed system enters Sales/After Flow Mode 500. It should be noted, and will be explained below, that the disclosed system can also simulate a plunger arrival for any systems that do not have a plunger.

Figure 4:
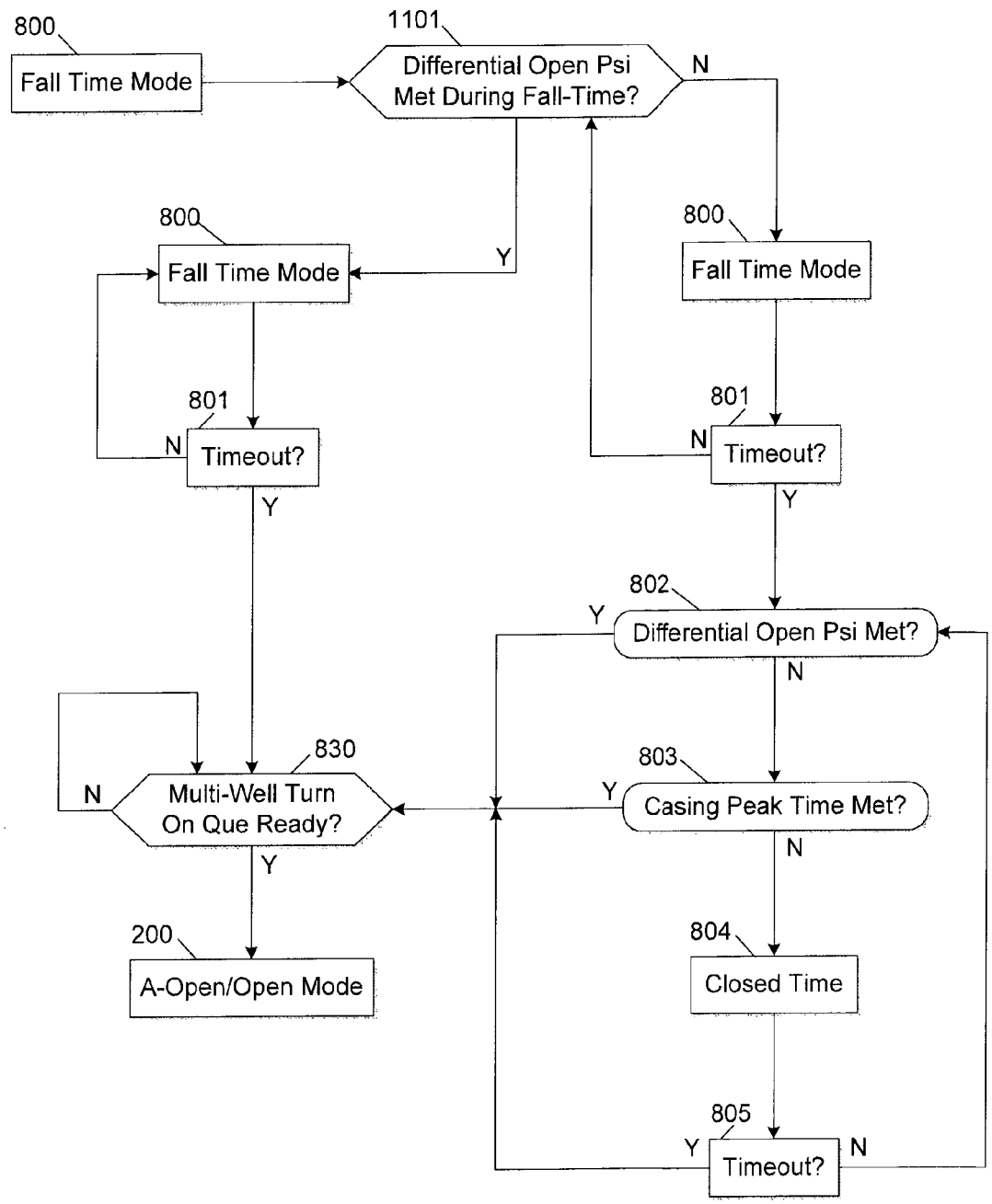
FIG. 4 is a flow chart expanding the "Fall-Time" mode of the disclosed method and apparatus.

Referring now to FIG. 4, it can be seen that during Fall-Time Mode 800, the disclosed system monitors and stores Differential Pressure Open 1101 for both true conditions and false conditions to make the necessary adjustments to the set points at a later time. Applicants believe this is unique to the disclosed system. If Differential Pressure Open 1101 is met during the designated fall time then Mode 800 is entered until timeout 801 is met. Multi-Well Turn On Queue 830 is checked to see if ready, and if ready, the system goes to A-Open Mode 200.

If the Differential Pressure Open 1101 is not met during the designated fall time then Mode 800 is entered and once timeout 801 has occurred, then Differential Pressure Open 802 is again tested. If met then Multi-Well Turn On Queue 830 is checked to see if ready, and if ready, the system goes to A-Open Mode 200. If Differential Pressure Open 802 is not met, then a check is done for casing peak time 803 being met. If the casing peak time 803 is met, then Multi-Well Turn On Queue 830 is checked to see if ready, and if ready, the system goes to A-Open Mode 200. If the casing peak time 803 is not met, the disclosed system will look at Closed-Time Mode 804. The Closed-Time Mode 804 is the maximum closed time for the well. Once the closed timeout 805 occurs, the disclosed system will check the Multi-Well Turn On Queue 830 to see if ready, and if ready, the system goes to A-Open Mode 200. If the closed timeout 805 has not occurred, then the disclosed system returns to check Differential Pressure Open 802.

Figure 5:
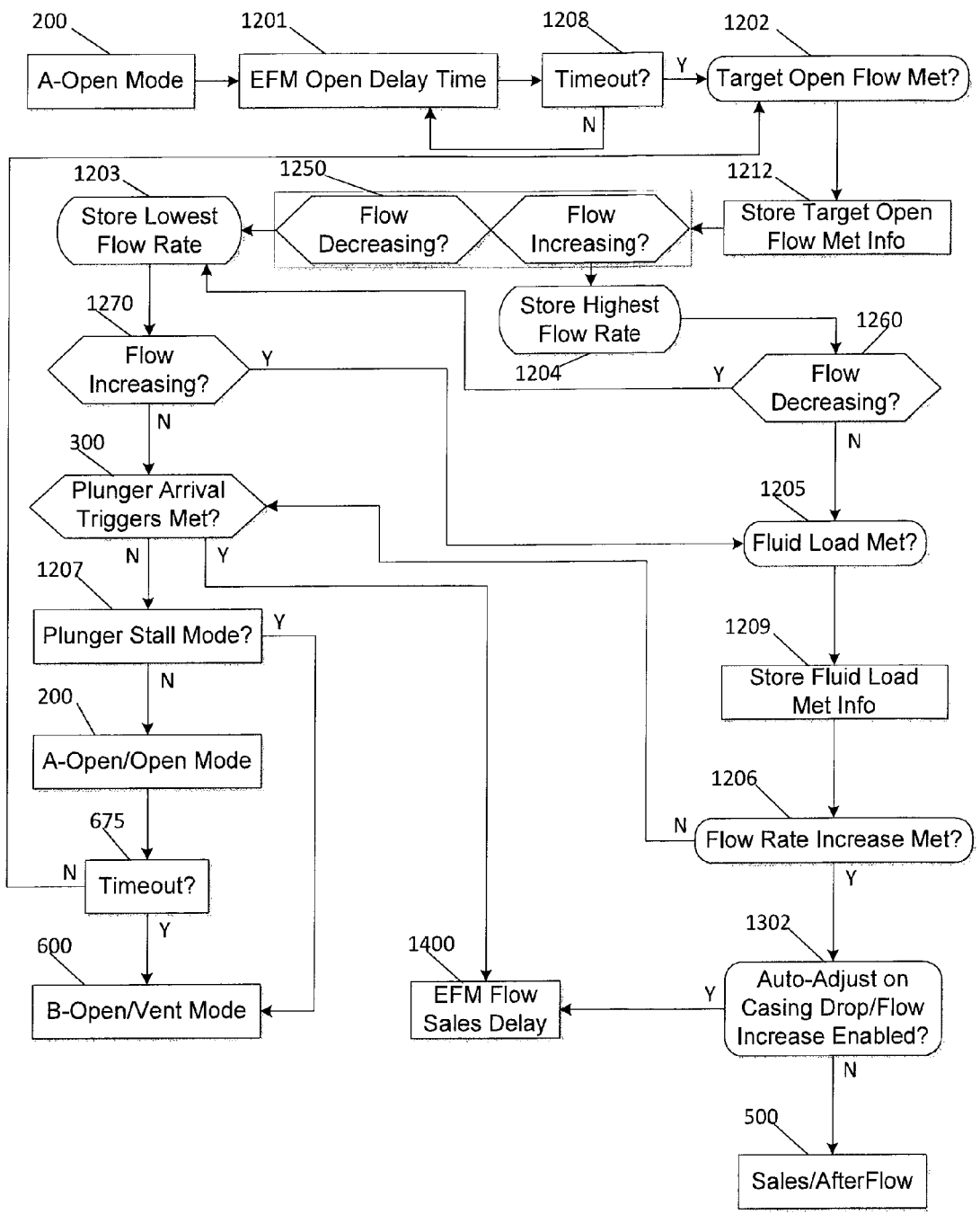
FIG. 5 is a flow chart expanding the "A-Open" mode generally depicted in FIG. 3.

FIG. 5 is a flow chart expanding the A-Open Mode 200 shown in FIG. 3. During this mode the well is open and gas and liquids are flowing into sales line 187. The disclosed system monitors, acknowledges and stores many triggers, also known as activation points, which allow the system to make adjustments to the system's set points after plunger/fluid load arrival to the surface.

When the disclosed system enters Mode 200 it also immediately begins counting down EFM Flow Increase Delay Time 1201 which allows one or more of the readings from the well to stabilize before the disclosed system will make any further decisions. After EFM Flow Increase Delay Time 1201 expires or times out 1208, the disclosed system will begin to monitor Target Open Flow Rate 1202 (from the EFM) and store information 1212 if met or if not met. After Target Flow Rate information is stored 1212, then the disclosed system will engage the I/P flow control device and begin controlling the well's flow/production rate.

The disclosed system will begin monitoring for flow to determine whether it is decreasing or increasing 1250. If it detects an increasing flow, it will store the highest flow rate 1204, and then immediately check for flow decreasing 1260. If flow is not decreasing at this point, then the disclosed system will check to see if the fluid load set point is met 1205 and if the set point is met, or is not met, the appropriate data is stored 1209. If flow rate increase set point is met 1206, then the disclosed system can assume the plunger has arrived (even if the system has no plunger). If the flow rate increase 1206 is not greater than the set point then the disclosed system awaits a plunger trigger 300. If the flow rate increase is met 1206, then the auto-adjust function of the disclosed system looks to see if an auto-adjust of casing drop/flow rate increase 1302 is enabled. If so, the disclosed system enters EFM Flow Sales Delay Mode 1400. If not enabled the disclosed system enters Sales/After Flow Mode 500.

Going back to the check point to see if flow is increasing or decreasing 1250, if the flow is decreasing the lowest flow rate is stored 1203. The flow is again checked to see if it is increasing 1270. If so, the disclosed system checks to see if the fluid load is met 1205 and proceeds as previously discussed. If flow is not increasing 1270, the disclosed system checks plunger arrival triggers 300. If plunger arrival triggers are detected, the disclosed system proceeds to EFM Flow Sales Delay Mode 1400. If no plunger arrival triggers are detected, the disclosed system enters Plunger Stall Mode 1207 (see also FIG. 6). If the set time out is reached the disclosed system will proceed to Mode 600 to open the 'B-Valve'. If the time set is not reached the disclosed system will enter Mode 200 and check the timeout 675. If no timeout has occurred, the disclosed system will return to step 1202 and continue monitoring target open flow. If timeout 675 occurs, the disclosed system will enter Mode 600.

Figure 6:
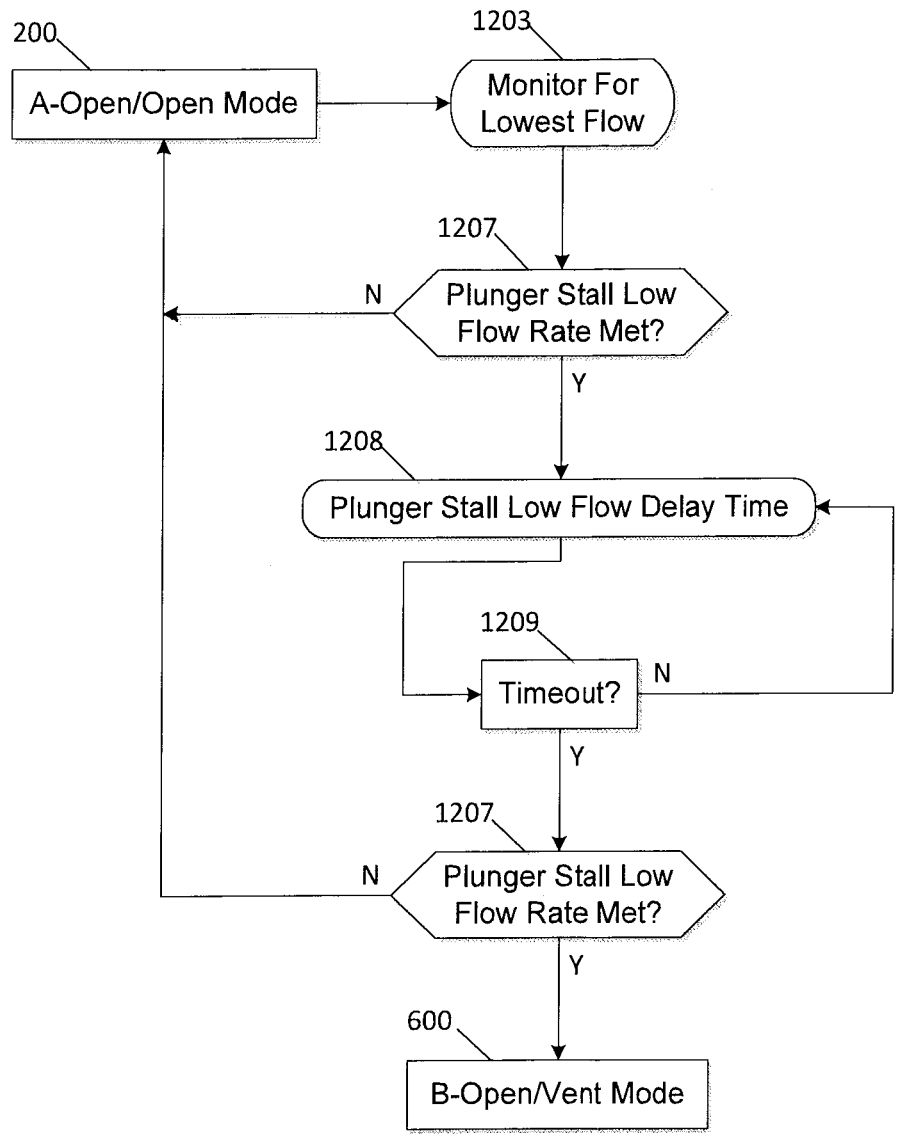
FIG. 6 is a flow chart expanding the "Plunger Stall" mode depicted in FIG. 5.

As can be seen in FIG. 6, the disclosed system monitors for lowest fluid flow and stores accumulated data 1203. A plunger stall low flow rate set point 1207 is monitored. This is a set point for the flow rate above the plunger. If not met (that is, not at or below the set point), then the disclosed system returns to the Mode 200 as data indicates there is no plunger stall. If the plunger stall low flow rate 1207 is met, that is, the flow rate above the plunger is at or below the set point, the disclosed system proceeds to monitor plunger stall low flow delay time 1208 and starts a timeout period 1209. Once timeout 1209 has occurred, the plunger stall low flow rate 1207 is again checked. If it again has been met (at or a setting below) then the disclosed system proceeds to Mode 600 to open the vent. If not met, then the disclosed system returns to Mode 200 indicating the plunger has not stalled.

Figure 7:
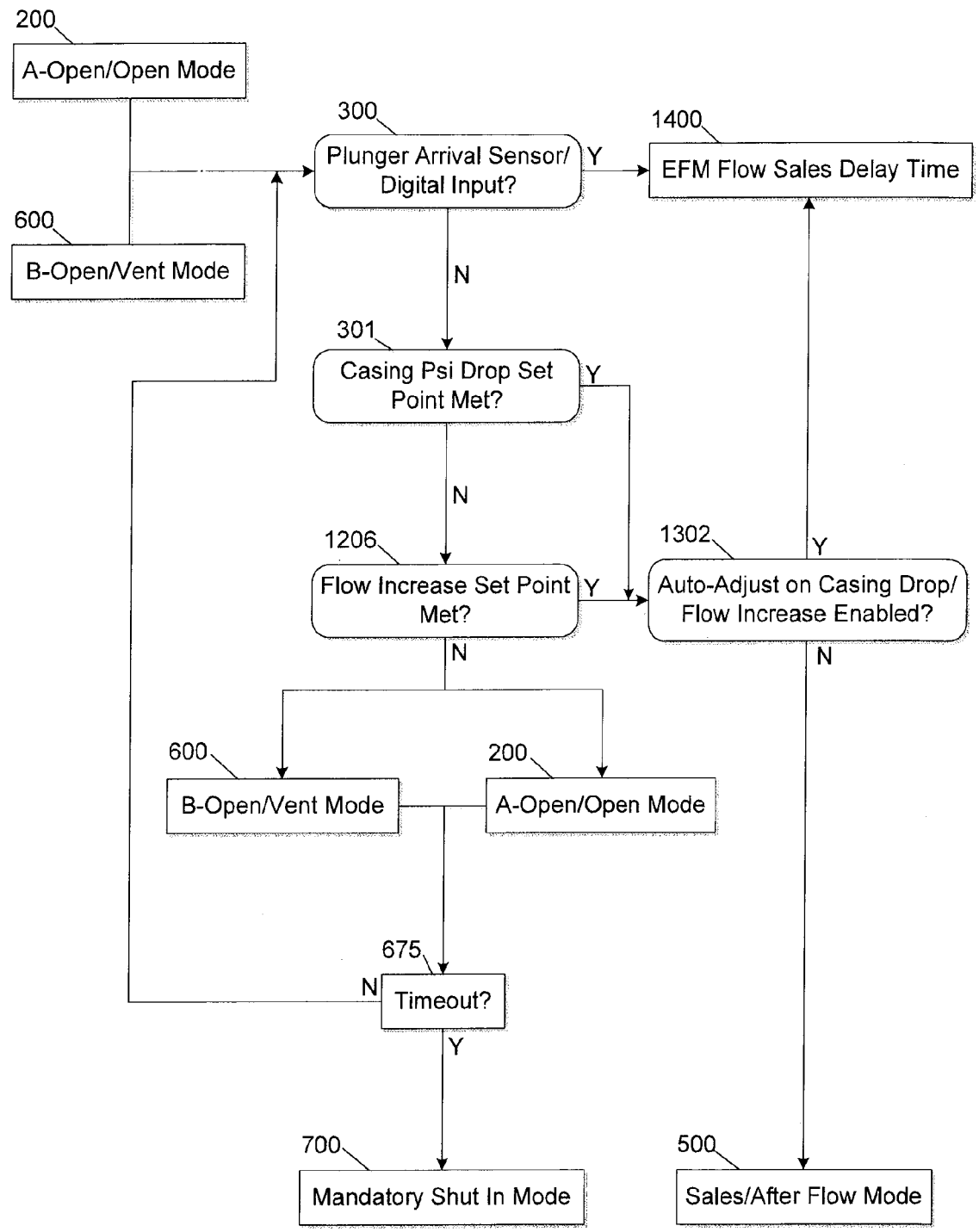
FIG. 7 is a flow chart expanding the plunger arrival triggers shown in FIGS. 3, 5.

As shown in FIG. 7, plunger arrival triggers 300 can be used to monitor a plunger's arrival via a sensor or digital input. If plunger arrival is confirmed, then the disclosed system enters EFM Flow Sales Delay Time Mode 1400. If plunger arrival is not triggered, the disclosed system monitors a casing pressure drop set point 301. If the well's line pressure is not below the set point, then the disclosed system will determine if a flow increase set point 1206 is met. This is a delta between the highest and lowest measured flow rate. If it is not met then the disclosed system will go to Mode 200. If the time out 675 is exceeded, the disclosed system will enter Mode 700 which closes the well as no plunger arrival was sensed. If the timeout has not yet occurred, then the disclosed system will enter Mode 600, thereby opening valve 275. This activity is followed by monitoring plunger arrival 300. If the casing pressure drop set point 301 and flow increase set point 1206 are still not met, the disclosed system continues Mode 600 followed by Mode 700 if timeout 675 occurs while in the system is in Mode 600. In other words, the B valve is open but the plunger has not yet arrived.

If the casing pressure drop set point 301 is met, whereby casing pressure is at or below set point, OR if the flow increase set point 1206 is met, these could indicate a well without a plunger and the disclosed system will go to Auto-Adjust Mode 1302 If Mode 1302 is enabled, the disclosed system simulates the arrival of a plunger and enters the EFM Flow Sales Delay Time Mode 1400. If the Auto-Adjust Mode 1302 is not enabled, then the disclosed system goes to Sales/After Flow Mode 500 or to immediate sales.

Figure 8:
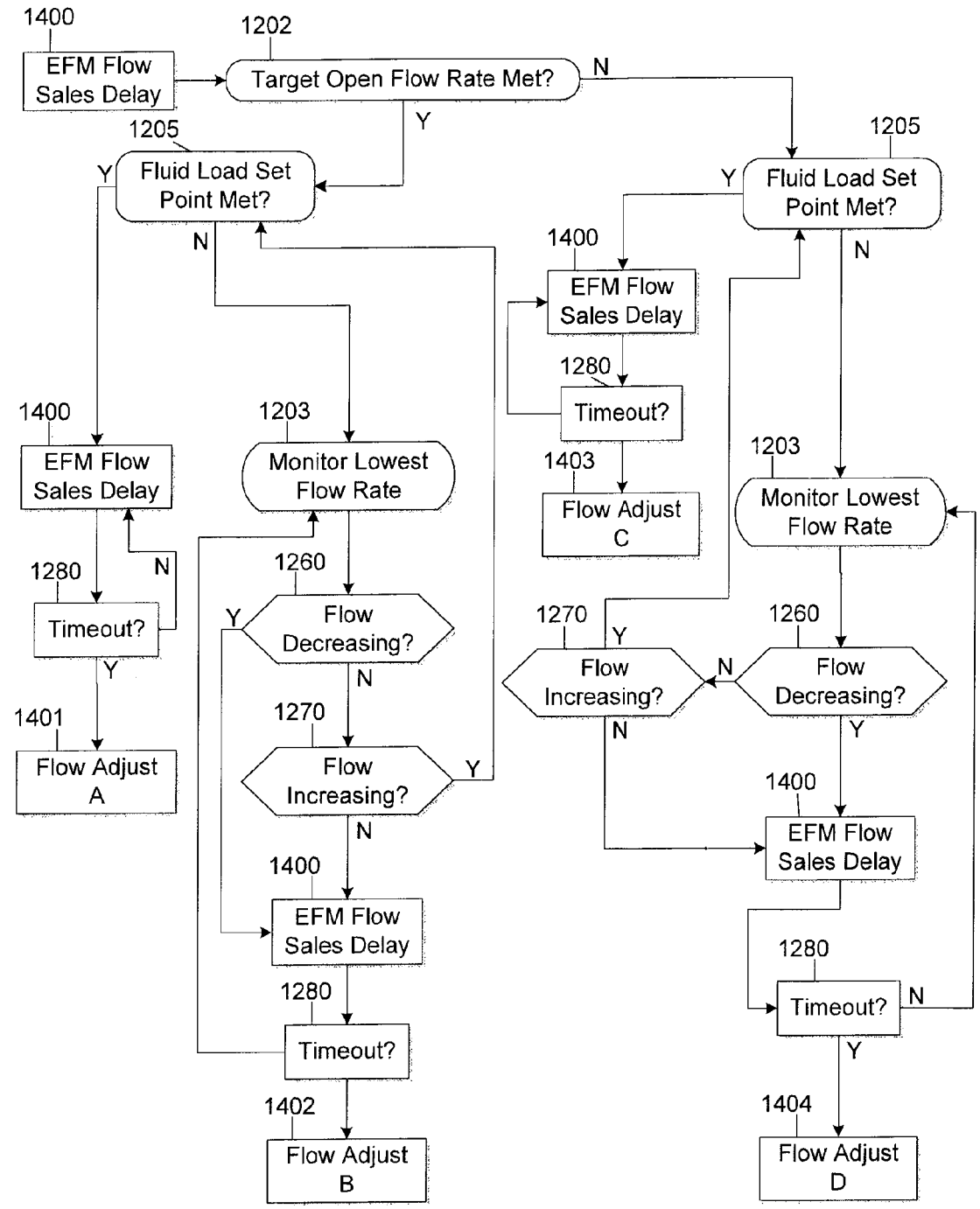
FIG. 8 is a flow chart expanding the "EFM Flow Sales Delay Time" mode as generally depicted in FIGS. 3, 7.

As shown in FIG. 8, EFM Sales/Delay Mode 1400 comprises four adjustment events: Flow Adjust "A" 1401, Flow Adjust "B" 1402, Flow Adjust "C" 1403 and Flow Adjust "D" 1404. In Mode 1400 the plunger/fluid load has arrived at the surface of the well and the A valve is open. The disclosed system immediately begins counting down EFM Flow Sales Delay Time Mode 1400 and continually measures the well's flow rate to see if the target open flow rate 1202 is met.

If target open flow rate 1202 is met, the system monitors fluid load set point 1205. The disclosed system will acknowledge whether a fluid load was met and use this information to make adjustments to the set points of the disclosed system at a later point. If the fluid load set point 1205 is met, then the disclosed system will maintain the EFM Sales Delay Mode 1400 until timeout 1280 occurs. In Mode 1400, the disclosed system will no longer monitor for a fluid load. After timeout 1280 occurs, the system will go to Flow Adjust "A" (Mode 1401) a mode which signifies the target open flow rate and the fluid load set points were both met.

If the fluid load set point 1205 is not met, the disclosed system will monitor the lowest flow rate 1203. If the flow is determined to be decreasing 1260, the system will remain in Mode 1400 until timeout 1280 occurs. The system moves into Flow Adjust "B" (Mode 1402). Entering Mode 1402 signifies that Target Open Flow Rate was met and that the fluid load set point was not met. If the flow rate is increasing 1270, however, the system will continue to monitor fluid load set point 1205.

If the target open flow rate is not met in step 1202 then the disclosed system monitors the fluid load set point 1205. The disclosed system will remain in the EFM Sales Delay Mode 1400 if the designated set point is met. After timeout 1280 the system will advance to Flow Adjust "C" (Mode 1403). The system disclosed herein signifies that the target open flow rate 1202 was not met and the fluid load set points 1205 were met, which is considered "optimized".

If during the EFM Flow Sales Delay 1400 mode, the target open flow rate 1202 is not met and the fluid load set point 1205 is not met, the disclosed system will monitor the lowest flow rate 1203. If the flow is decreasing 1260, the system will remain in Mode 1400 until timeout 1280 occurs, moving it into Flow Adjust "D" (Mode 1404). Entering Mode 1404 signifies that Target Open Flow Rate 1202 and the fluid load set points 1205 were both not met. If the flow rate is increasing 1270, the disclosed system will continue to monitor the fluid load set point 1205.

In Mode 1400, the disclosed system continuously monitors the well's flow rate. If the flow rate increases above the set point, then the disclosed system will engage the I/P flow control device to keep the flow rate near or at the set point. The disclosed system continuously monitors the critical flow rate/critical flow K set point and sales low flow rate set points which will be discussed further below.

Figure 9:
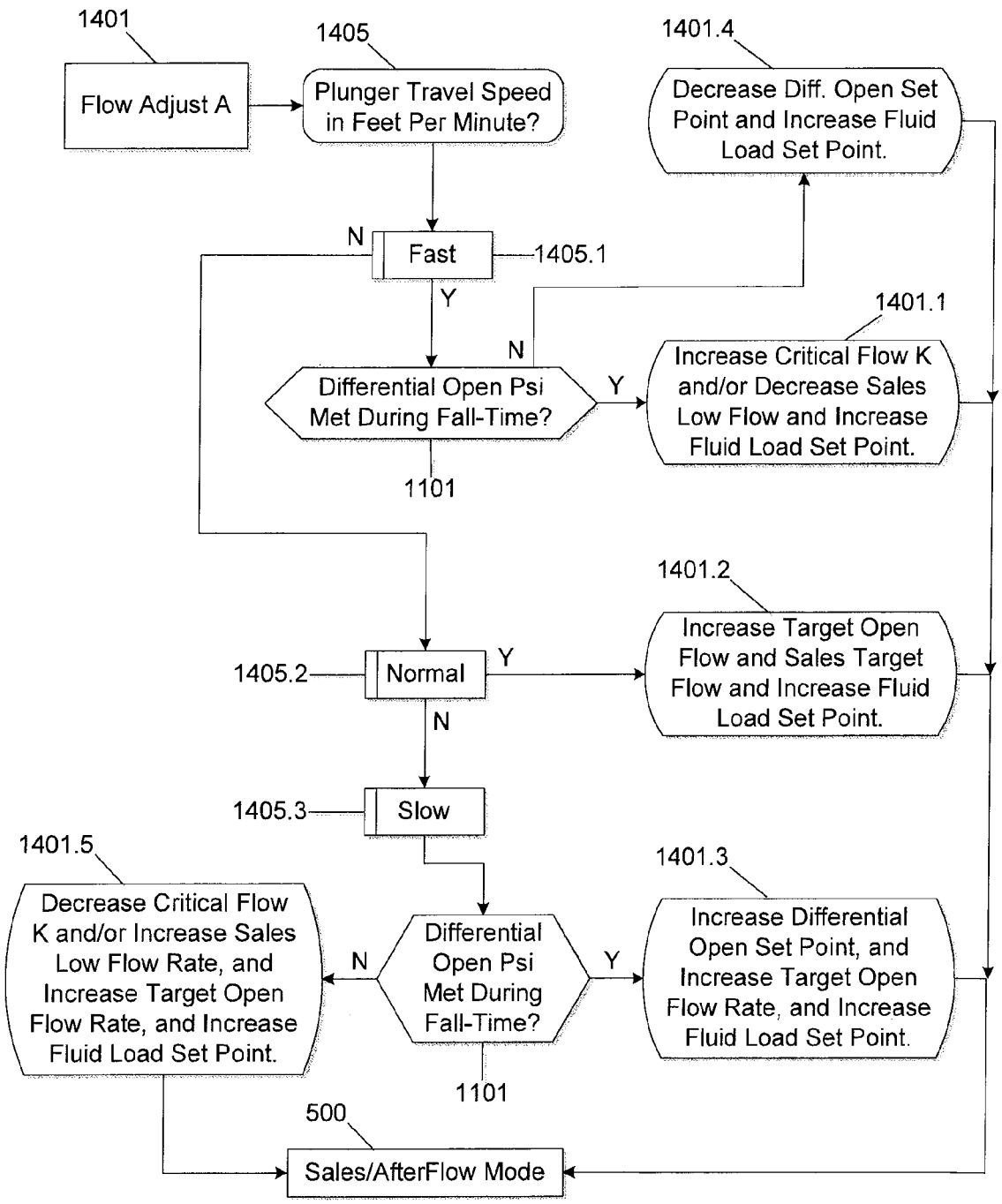
FIG. 9 is a flow chart expanding adjustment procedure "A" as generally depicted in FIG. 8.

FIG. 9 further describes Mode 1401 or Flow Adjust "A" which signifies that the target open flow rate 1202 and the fluid load set points 1205 were both met. At this point the disclosed system will look at the travel speed 1405 of the plunger/fluid load and make adjustments to the disclosed system as necessary. Adjustments are made based off of the stored and acknowledged settings and targets that were triggered after Mode 1400 expired and before the EFM flow increase delay time expired 1280 in Sales/After Flow Mode (Mode 500).

The disclosed system calculates the plunger/fluid load travel speed or velocity from the bottom of the tubing to the well head. The system monitors the plunger/fluid load travel speed 1405 from the bottom of the tubing to the surface of the well as well as monitoring time. The desired maximum travel speed and minimum travel speed are both user programmable into the disclosed system. Also, the well's depth is user programmable and can be set into the disclosed system. If the plunger/fluid load travel speed is faster/greater than the maximum travel speed set point, that plunger/fluid load travel cycle would be considered to be "FAST" 1405.1. If the plunger/fluid load travel speed is slower/less than the minimum travel speed set point, that plunger/fluid load travel cycle would be considered to be "SLOW" 1405.3. If the plunger/fluid load travel speed is slower/less than the maximum travel speed set point but also faster/greater than the minimum travel speed set point, that plunger/fluid load travel cycle would be considered to be "NORMAL" 1405.2. The ranges that can be achieved for set points of the disclosed system are as follows:

| PARAMETER | APPROXIMATE RANGE |
| --- | --- |
| Well Depth | 0 to 65,000 in feet |
| Maximum Travel Speed | 0 to 65,000 in fpm |
| Minimum Travel Speed | 0 to 65,000 in fpm |

To calculate the travel speed, the disclosed system takes the well depth (i.e., 6000 ft.) and divides it by the time (i.e., 8 minutes) that it took the plunger/fluid load to travel from the bottom of the tubing to the well's surface. In this example, travel speed would equal 750 fpm (6000 feet/8 minutes=750 fpm). Thus, the travel time of the plunger/fluid load in the example is 8:00 minutes and the travel speed of the plunger/fluid load in the example is 750 fpm. If the maximum travel speed set point is set to 800 fpm and the minimum travel speed set point is set to 700 fpm, the plunger/fluid load travel cycle of the disclosed invention would be considered NORMAL 1405.2. The following actions are taken based on the plunger travel speed and prior to going to Sales/After Flow Mode 500:

1. If Fast 1405.1 then proceed to check if differential open pressure is met during fall-time 1101. If so, then proceed to 1401.1 and increase critical flow K and/or decrease sales low flow 502 and increase fluid load set point 1205. If the differential open pressure is not met during fall time 1101 then the disclosed system proceeds to 1401.4 and decreases the differential open set point 802 and increases the fluid load set point 1205. If the differential open pressure is met during fall time then the disclosed system proceeds to Mode 500.

2. If Normal 1405.2 then proceed to 1401.2 and increase the target open flow and sales flow and target open flow 1202 and fluid load set point 1205.

3. If Slow 1405.3, then proceed to check if the differential open pressure was met during fall time 1101. If so, then proceed to 1401.3 and differential open set point 802 and increase the target open flow rate 1202, and increase the fluid load set point 1205. If not, the disclosed system proceeds to 1401.5 where the system will decrease the critical flow K and/or increase the sales low flow rate and increase the target open flow rate, and increase the fluid load set point. After any of the Fast, Normal, and Slow determinations of plunger travel speed, the disclosed system proceeds to Sales/After Flow Mode 500.

Figure 10:
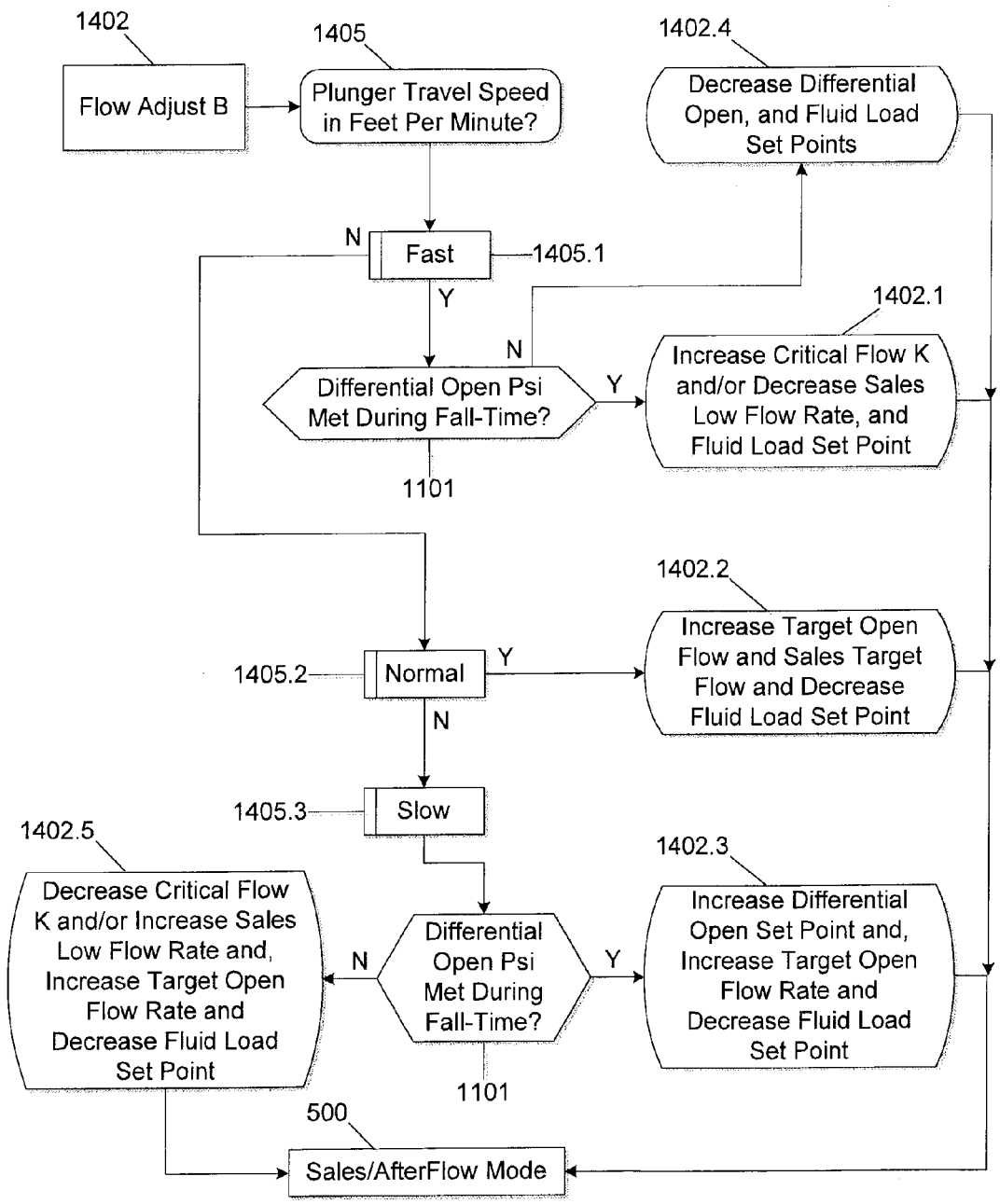
FIG. 10 is a flow chart expanding adjustment procedure "B" as generally depicted in FIG. 8.

FIG. 10 depicts additional details regarding Flow Adjust "B" (Mode 1402) which is a result of the target open flow 1202 being met and the fluid load set point 1205 not being met. Here, the disclosed system will look at the travel speed 1405 of the plunger/fluid load and make adjustments as necessary based off of the stored and acknowledged settings and targets that were triggered after Mode 1400 expired in "A-Open" and before the EFM flow increase delay time expired 1280 in Sales/After Flow Mode 500.

The disclosed system calculates the plunger/fluid load travel speed or velocity from the bottom of the tubing to the well head. The system monitors the plunger/fluid load travel speed 1405 from the bottom of the tubing to the surface of the well as well as monitoring time. The desired maximum travel speed and minimum travel speed are both user programmable into the disclosed system. Also, the well's depth is user programmable and can be set into the disclosed system. If the plunger/fluid load travel speed is faster/greater than the maximum travel speed set point, that plunger/fluid load travel cycle would be considered to be "FAST" 1405.1. If the plunger/fluid load travel speed is slower/less than the minimum travel speed set point, then that plunger/fluid load travel cycle would considered to be "SLOW" 1405.3. If the plunger/fluid load travel speed is slower/less than the maximum travel speed set point but also faster/greater than the minimum travel speed set point then, that plunger/fluid load travel cycle would be considered to be "NORMAL" 1405.2. The following actions are taken based on the plunger travel speed and prior to going to Sales/After Flow Mode 500:

1. If Fast 1405.1 then proceed to check if differential open pressure is met during fall-time 1101. If so, then proceed to 1402.1 and increase critical flow K 501 and/or decrease sales low flow 502 and decrease fluid load set point 1205. If the differential open pressure is not met during fall time then the disclosed system proceeds to 1402.4 and decreases the differential open 802 and the fluid load set points 1205.

2. If Normal 1405.2 then proceed to 1402.2 and increase the target open flow and sales target flow 1202 and decrease the fluid load set point 1205.

3. If Slow 1405.3, then check to see if the differential open pressure was met during fall time 1101. If so, then proceed to 1402.3 and increase differential open set point 802 and the target open flow rate 1202, and decrease the fluid load set point 1150. If not, the disclosed system proceeds to 1402.5 where the system will decrease the critical flow K 501 and/or increase the sales low flow rate 502 and increase the target open flow rate, 1202 and decrease the fluid load set point 1205. After any of the Fast, Normal and Slow determinations of plunger travel speed, the disclosed system proceeds to Mode 500.

Figure 11:
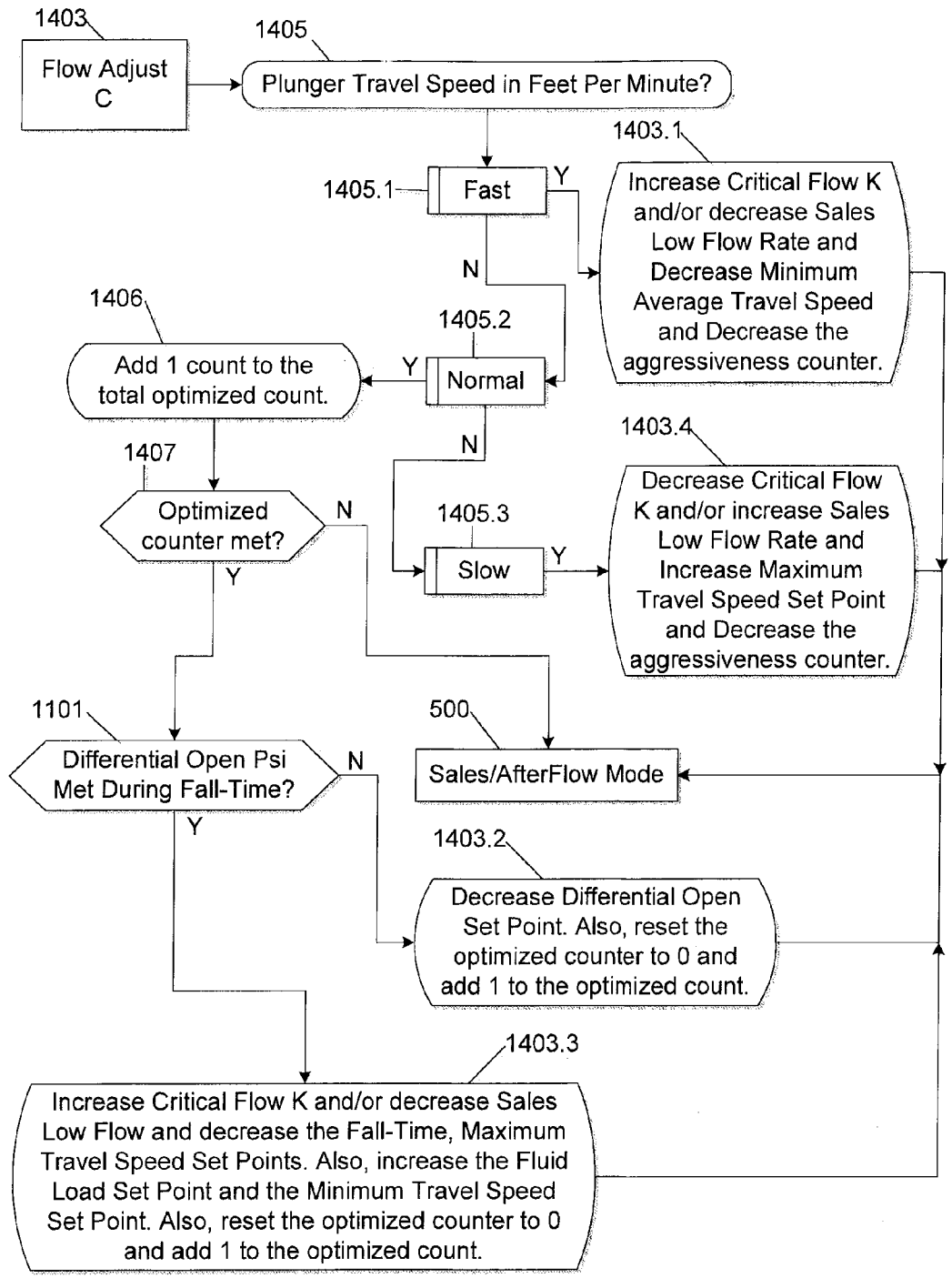
FIG. 11 is a flow chart expanding adjustment procedure "C" as generally depicted in FIG. 8.

FIG. 11 provides additional details regarding Flow Adjust "C" (Mode 1403) which is a result of the target open flow 1202 not being met and the fluid load set point 1205 being met. In this scenario, a well is considered to be optimized. Here, the disclosed system will look at the travel speed 1405 of the plunger/fluid load and make adjustments as necessary based off of the stored and acknowledged settings and targets that were triggered after the EFM Flow Sales Delay 1400 expired in A-Open/Open Mode 200 and before the EFM flow increase delay time expired 1280 in Sales/After Flow Mode 500.

The disclosed system calculates the plunger/fluid load travel speed or velocity from the bottom of the tubing to the well head. The system monitors the plunger/fluid load travel speed 1405 from the bottom of the tubing to the surface of the well as well as monitoring time. The desired maximum travel speed and minimum travel speed are both user programmable into the disclosed system. Also, the well's depth is user programmable and can be set into the disclosed system. If the plunger/fluid load travel speed is faster/greater than the Maximum Travel Speed set point, that plunger/fluid load travel cycle would be considered to be a "FAST" 1405.1 travel speed. If the plunger/fluid load travel speed is slower/less than the minimum travel speed set point, then that plunger/fluid load travel cycle would considered to be "SLOW" 1405.3. If the plunger/fluid load travel speed is slower/less than the maximum travel speed set point but also faster/greater than the minimum travel speed set point, that plunger/fluid load travel cycle would be considered to be "NORMAL" 1405.2. The following actions are taken based on the plunger travel speed and prior to going to Mode 500:

1. If Fast 1405.1 then proceed to 1403.1 and increase the critical flow K 502 and/or decrease sales low flow rate and decrease the minimum average travel speed and decrease the optimized counter 1407. The system then proceeds to Mode 500.

2. If Normal 1405.2 then proceed to 1406 and add one (1) count to the total optimized count 1406. If the optimized counter 1407 is not met, then proceed to Mode 500. If the optimized counter 1407 is met, then the system checks if the differential open pressure 1101 is met during plunger fall time. If the differential open pressure 1101 is not met, the system proceeds to Mode 1403.2 and decreases differential open set point 802 and adds one (1) to optimized counter 1407, resets optimized count decreases differential open set point 1406 to zero (0) then proceeds to Mode 500. If the differential open pressure 1101 is met the system proceeds to 1403.3 and increases the critical flow K 501 and/or decrease sales low flow 502 and decrease the fall-time and maximum travel speed set points. The system also increases the fluid load 1205 and the minimum travel speed set points. The optimized counter 1406 is reset to 0 and one (1) count is added to the optimized counter 1407. The system then returns to Mode 500.

3. If Slow 1405.3, then proceed to 1403.4 and decrease critical flow K 501 and/or increase sales low flow rate 502 and increase maximum travel speed set point and decrease the optimized counter 1407. The system then returns to Mode 500.

Figure 12:
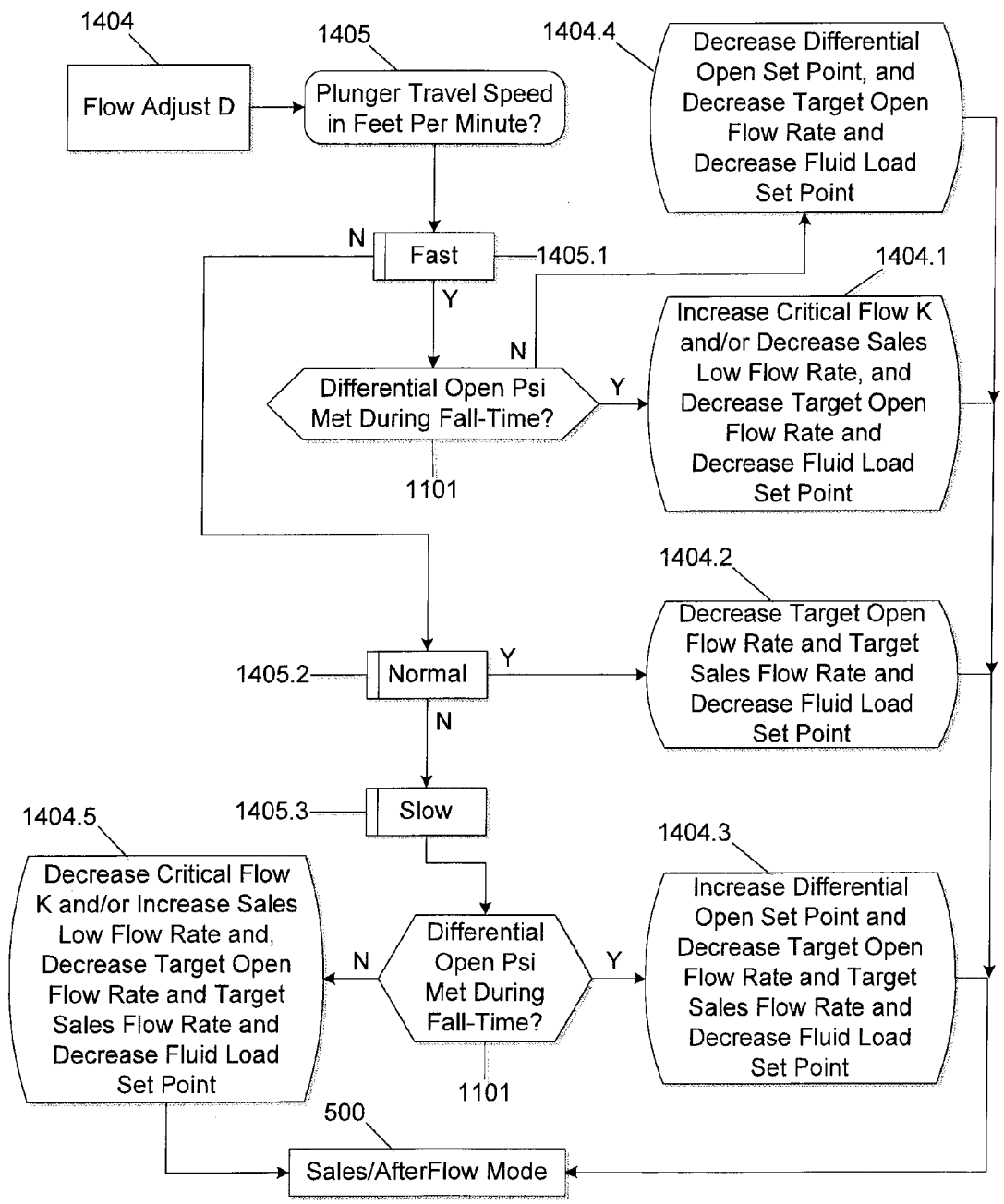
FIG. 12 is a flow chart expanding adjustment procedure "D" as generally depicted in FIG. 8.

FIG. 12 provides additional details regarding Flow Adjust "D" (Mode 1404) which is a result of both the target open flow 1202 and the fluid load set point 1205 not being met. Here, the disclosed system will look at the travel speed 1405 of the plunger/fluid load and make adjustments as necessary based off of the stored and acknowledged settings and targets that were triggered after the EFM Flow Sales Delay Time 1400 expired in A-Open/Open Mode and before the EFM flow increase delay time expired 1280 in Sales/Delay mode 500.

The disclosed system calculates the plunger/fluid load travel speed or velocity from the bottom of the tubing to the well head. The system monitors the plunger/fluid load travel speed 1405 from the bottom of the tubing to the surface of the well as well as monitoring time. The desired maximum travel speed and minimum travel speed are both user programmable into the disclosed system. Also, the well's depth is user programmable and can be set into the disclosed system. If the plunger/fluid load travel speed is faster/greater than the maximum travel speed set point, that plunger/fluid load travel cycle would be considered a "FAST" 1405.1 travel speed. If the plunger/fluid load travel speed is slower/less than the minimum travel speed set point then, that plunger/fluid load travel cycle would considered to be "SLOW" 1405.3. If the plunger/fluid load travel speed is slower/less than the maximum travel speed set point but also faster/greater than the minimum travel speed set point then, that plunger/fluid load travel cycle would be considered to be "NORMAL" 1405.2. The following actions are taken based on the plunger travel speed and prior to going to Mode 500:

1. If Fast 1405.1 check to see if the differential open pressure was met during fall time 1101. If met then proceed to 1404.1 and increase the critical flow K 501 and/or decrease the sales low flow rate 502 and decrease the target open flow rate 1202 and decrease the fluid load set point 1205. If not met then proceed to 1404.4 and decrease the differential open set point, 802 the target open flow rate 1202 and the fluid load set point 1205.

2. If Normal 1405.2 then proceed to 1404.2 and decrease the target open flow and sales target flow 1202 and decrease the fluid load set point 1205.

3. If Slow 1405.3, then check to see if the differential open pressure was met during fall time 1101. If met then proceed then proceed to 1404.3 and increase the differential-open set point 802 and decrease the target open flow rate 1202 and target sales flow rate and the fluid load set point 1205. If not met proceed to 1404.5 and decrease the critical flow K 501 and/or increase the sales low flow rate 502, and decrease the target open flow rate 1202, target sales flow rate and fluid load set point 1205. After any of the Fast, Normal and Slow determinations of plunger travel speed, the disclosed system proceeds to Mode 500.

Figure 13:
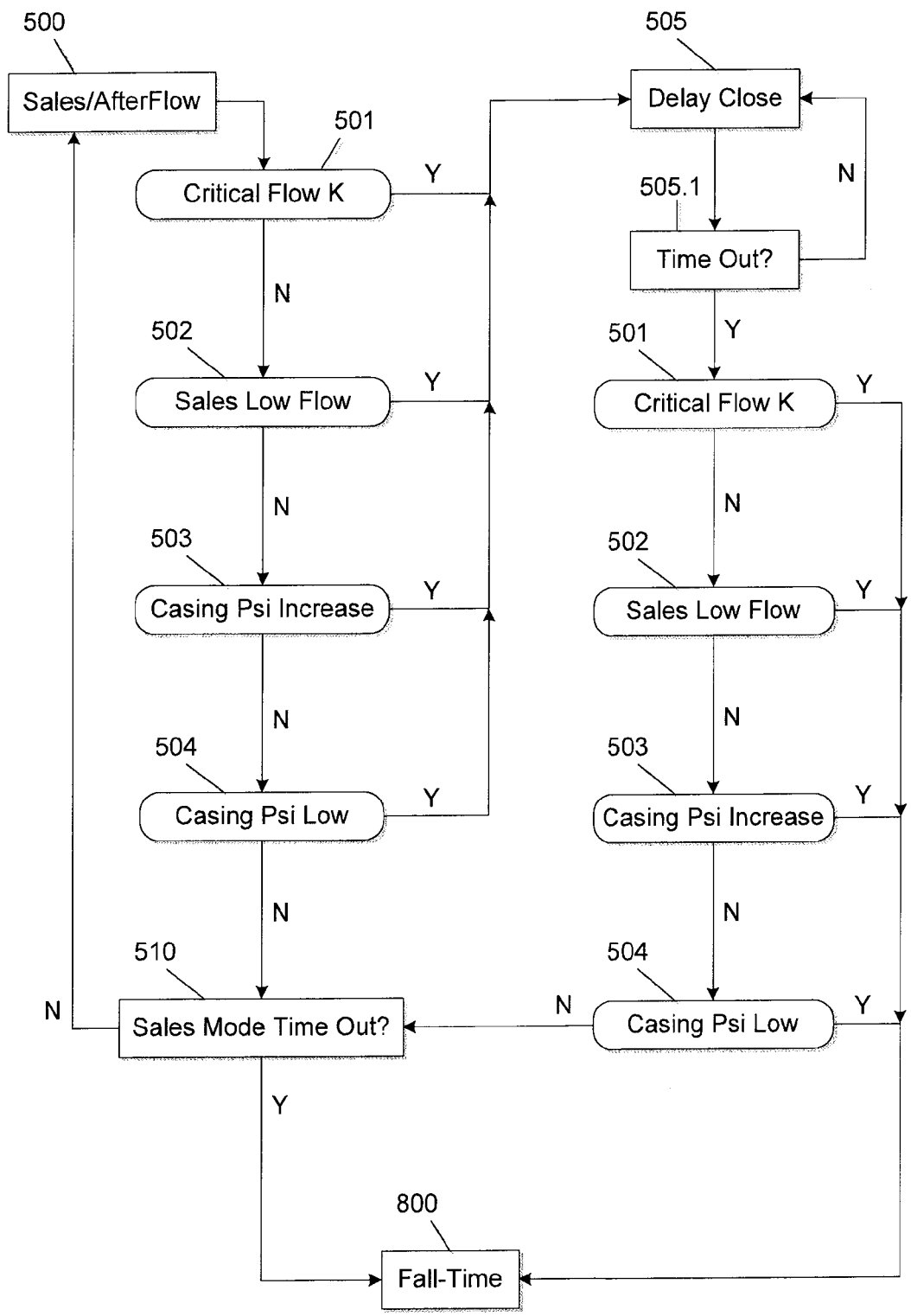
FIG. 13 is a flow chart expanding the "Sales/Afterflow" mode generally depicted in FIG. 3.

FIG. 13 provides additional details for Mode 500 as depicted in FIGS. 3, 7, 9, 10, 11, and 12. When the disclosed system enters Mode 500, it monitors critical flow K 501 to determine whether critical flow set point K 501 is met. If not, the disclosed system monitors sales low flow 502, casing pressure increase 503 and casing pressure low set point 504. If none of these set points are met then the system proceeds to Sales Mode Time Out 510. If any of critical flow K 501 sales low flow 502, casing pressure increase 503 or casing pressure low set point 504 are met the disclosed system proceeds to Delay Close Mode 505.

If the system stays in Mode 505 until timeout 505.1 occurs at which time the system checks critical flow K 501, sales low flow 502, casing pressure increase 503 and casing pressure low set point 504. If none of these are met the system goes to Sales Mode Time Out 510. If any of critical flow 501, or sales flow 502, casing pressure increase 503, or casing pressure low set point 504 are met, the disclosed system proceeds to fall time 100 in which case all the valves 175 and 275 on the well will be closed and the well will be shut-in.

If Sales Mode Time Out 510 occurs, the disclosed system will proceed to Fall Time 800 allowing the plunger to fall and close the well.

Figure 14:
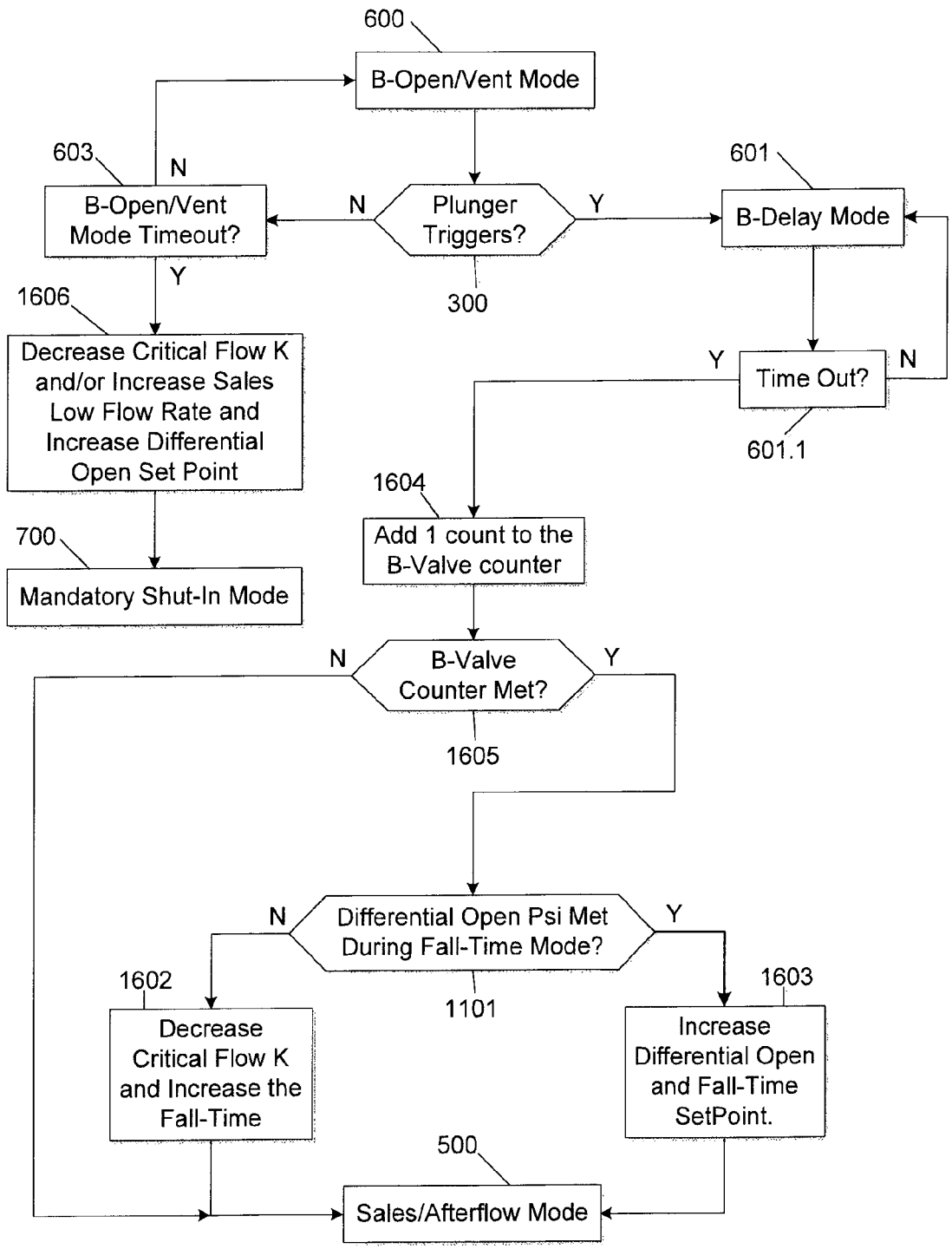
FIG. 14 is flow chart expanding of the "B-Open" mode described herein.

FIG. 14 is a flow chart expanding the B-Open Mode 600 shown in FIG. 3. The B valve provides a backup procedure for allowing a higher differential pressure between the casing and wellhead in instances where the plunger does not arrive when the A valve is open. During the entirety of the time period designated for Mode 200, the disclosed system monitors the well's flow/production rate and looks/monitors for a plunger/fluid load arrival signal/trigger. This may be a trigger which is activated by a digital switch input or a casing pressure or by a flow rate increase. Once conditions put the system in Mode 600, the disclosed system will monitor for plunger triggers 300. If no triggers are sensed prior to B-Open/Vent Mode Timeout 603, the system, as shown in 1606 will decrease the critical flow K 501 and/or increase the sales low flow rate 502, and increase the differential open set point 802. The system then goes into mandatory shut-in mode 700 and well production is closed. Prior to the expiration of timeout 603, the disclosed system continues to monitor for plunger triggers 300. If a plunger trigger occurs, the disclosed system enters B-Delay Mode 601 with time-out 601.1 allowing for system stabilization. Once the time-out period expires, the disclosed system will add one (1) count to the B valve counter 1604 and check to see if the B valve counter 1605 set point is met.

If the counter 1605 is not met, the disclosed system will proceed to Mode 500. If the counter 1605 set point is met, the disclosed system will check to see if the differential pressure is met during fall-time mode 1101. If the disclosed system detects that a Differential Open pressure 1101 has been met, the disclosed system will proceed to 1603 and increase the differential open 802 and fall-time set point then proceed to Mode 500. If the Differential Open pressure 1101 is not met during fall time mode, then the disclosed system will proceed to mode 1602 and decrease the critical flow K 501 and increase the fall-time set point 1602 then proceed to Mode 500. The Fall-Time Mode 800 is the minimum closed time for the well, which ensures that the plunger/artificial lift device has made it completely to the bottom of the tubing string.

Figure 15:
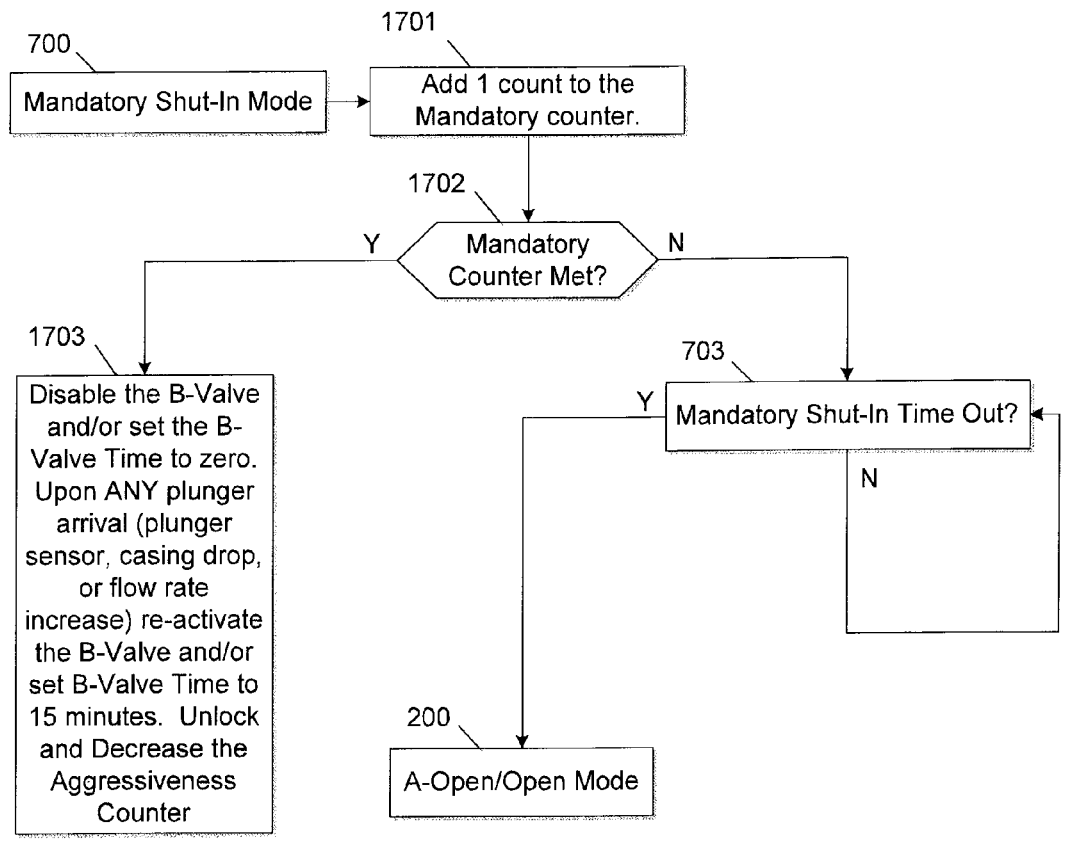
FIG. 15 is a flow chart illustrating an example of a mandatory shut-in mode as generally depicted in FIGS. 3, 7, 14.

FIG. 15 is a flow chart expanding the mandatory shut in mode or Mode 700 shown in FIGS. 3, 7, 14. In Mode 700, the disclosed system will add one (1) to the mandatory counter 1701. The disclosed system will then check to see if the mandatory counter set point is met 1702. If so, the disclosed system will proceed to step 1703 and disable the B-Valve and/or set the B-Valve time to zero. Upon the occurrence of any arrival trigger (plunger sensor, casing drop, or flow rate increase) 300 the disclosed system will re-activate the B valve and/or set the B valve time to 15 minutes and then unlock and decrease the optimized counter 1407. If the mandatory counter set point 1702 is not met, the disclosed system will check the mandatory shut-in timeout 703. When the timeout period expires the disclosed system will proceed to Mode 200.

Figure 16:
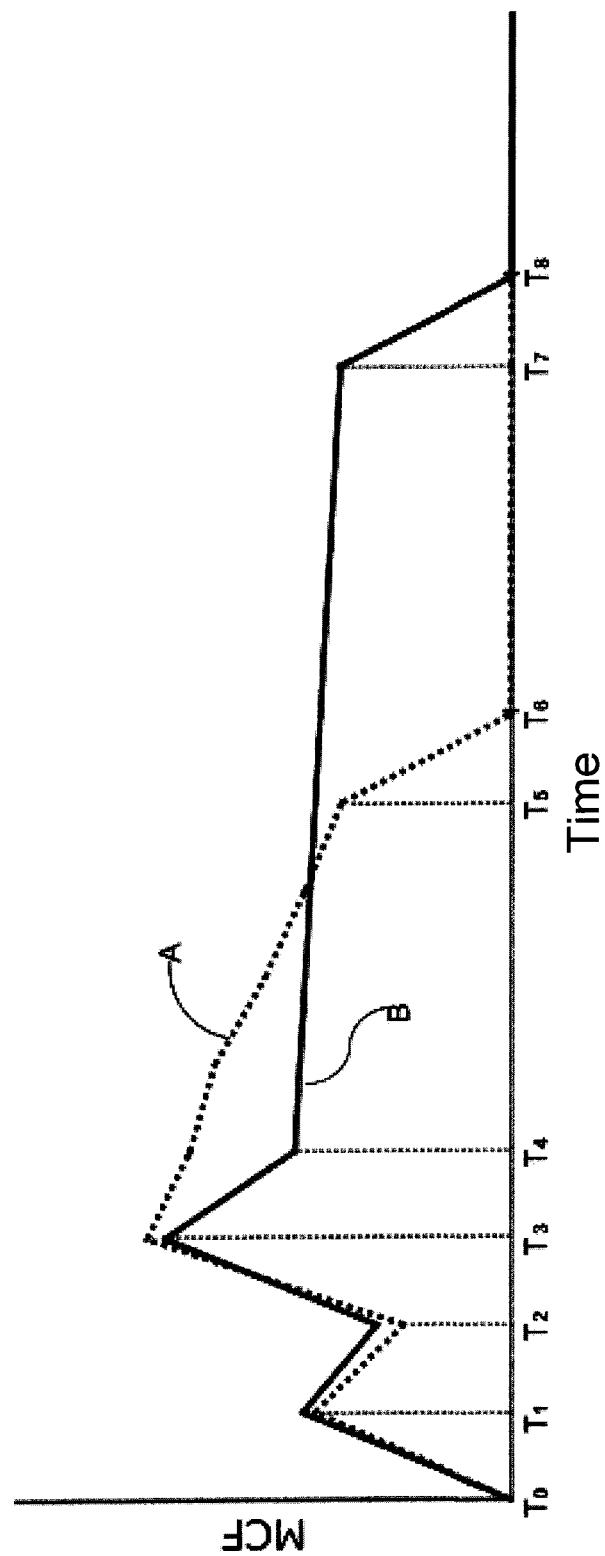
FIG. 16 is a graphical depiction of well flow versus time which compares the use of disclosed methodology with that of a conventional system.

An alternate embodiment of the disclosed system allows the user to select which actions can be avoided in the actions taken after plunger travel speed is calculated. That is, the actions following fast, normal and slow plunger travel speed calculations as shown above in FIGS. 9, 10, 11, 12, 14, 15 could be limited. The alternate embodiment would allow the user to elect to not take any or all combinations of actions on various parameter set points. Such actions may be a combination of one or more of the following:

1. Keeping the differential open set point 802 at a constant level
2. Keeping the fluid load set point 1205 at a constant level
3. Keeping the critical flow (K) 501 at a constant level
4. Keeping the sales low flow point 502 at a constant level
5. Keeping the target open flow rate 1202 at a constant level
6. Keeping the sales flow rate at a constant level
7. Keeping the maximum or minimum travel speed set point at a constant level
8. Keeping the optimized counter 1407 at a constant level
9. Keeping the fall time set point 800 to a constant level FIG. 16 is a diagram of well flow versus time. As shown, the dotted line "A" depicts well flow from a conventional system. Solid line "B" depicts an example of well flow using the disclosed system. The "A-Open" mode starts at point $T_0$ and continues to $T_3$. Prior to "A-Open" the plunger is at the bottom of the well with a fluid load perched over it and a gas load perched over the fluid load. Between $T_0$ and $T_1$ fluid starts moving up towards the surface and gas (perched on top of the plunger and fluid, respectively) begins to be expelled. In this period, lines A and B appear to be similar.

At $T_2$ gas, fluid and the plunger begin arriving at the surface. The negative slope of lines A and B between $T_1$ and $T_2$ is attributed to the fact that the gas (over the plunger and fluid) initially arriving at the surface has been exhausted and the fluid above the plunger begins to arrive at the surface of the well. At $T_2$ line B exceeds line A in flow volume.

Between $T_2$ and $T_3$ fluid continues to move up towards the surface; the fluid load was measured as previously described. At $T_3$, evacuation of the fluid is completed and the plunger has arrived at the surface. Also at $T_3$ the system enters the "Sales Mode" for both lines A and B. At this point $T_3$ however, is where the disclosed system differentiates itself from the conventional system. As can be seen from line B, well flow is consistent from $T_4$ until $T_7$ during which the well enters a Fall-Time mode and the plunger is released and drops to the well bottom and the "A" valve is closed to stop production/flow.

As can be seen using dotted line A, the well enters Sales Mode at $T_3$. The well is allowed to flow freely until flow hits a pre-set value. The well is operated based on manual settings from $T_3$ to $T_5$. At $T_5$ the well enters Fall-Time mode until $T_6$ whereupon the plunger drops to the well bottom and the "A" valve is closed to stop production/flow. In comparing lines A and B, it is apparent that line B operates for a longer period of T than line A. In addition, the flow rate of line B is more consistent over time than that of line A. The disclosed system determines the Sales Mode total time-based on A-Open time measuring the highest and lowest peak ($T_2$ to $T_3$) to determine the travel speed and to optimize the liquid load. Thus, as shown, the disclosed system allows for a longer and controlled flow rate producing more volume.

The disclosed device provides a system for dynamically controlling well flow from a well comprising:

a controller in electronic communication with an A valve and a B valve, said A valve capable of controlling flow to a product sales line, said B valve capable of controlling flow to a vent line;

the controller comprising a flow program to communicate the opening and closure of the A valve and the B valve based on the occurrence of one or more events;

the flow program comprising a first mode (closed) wherein the A valve and the B valves are closed thereby shutting in a well, a second mode (open) wherein the A valve is opened to allow accumulated fluids and plunger lift equipment to travel up said well, said second mode having a plunger arrival detector to determine whether the A valve should be closed to allow pressure to build up in said well;

the flow program further comprising a third mode (EFM sales delay) that is triggered when a plunger arrival is detected, said third mode comprising a monitoring of one or more well parameters for a predetermined amount to time thereby delaying a sales time to determine whether said one or more well parameters trigger associated set points to warrant adjustments to said set points;

the flow program further comprising a fourth mode (sales) that is triggered after the predetermined amount of said third mode has expired whereby the A valve remains open to allow said well to produce for the amount of time designated for said fourth mode; and wherein the flow program returns to said first mode when said fourth mode has ended.

The third mode further comprises the making of adjustments to said set points prior to allowing sales to occur.

In addition, the one or more monitored well parameters comprises plunger travel speed, flow rate and differential pressure.

Also, said second mode comprises a flow rate increase setting that can be used to simulate a plunger (or fluid) arrival without the need for the installation of a plunger arrival sensor or a plunger lift system.

Said second mode comprises a tubing pressure increase setting that can be used to simulate a plunger (or fluid) arrival without the need for the installation of a plunger arrival sensor or a plunger lift system.

Said controller is in electrical communication with a pneumatic device attachable to the A valve to monitor one or more separate flow control set points and control said A valve as commanded, thereby allowing for control of the incoming flow in a well and the speed of a traveling plunger.

The third mode further comprises one or more opportunities to make adjustments to said set points. A monitoring of a target open flow rate and comparing whether a fluid load was met can be done. In addition, a monitoring of a plunger travel speed and determining whether to classify said speed as fast, normal or slow can also be done.

The disclosed device provides a method for dynamically controlling well flow from a well, the steps of the method comprising:

providing a controller in electronic communication with an A valve and a B valve, said A valve capable of controlling flow to a product sales line, said B valve capable of controlling flow to a vent line;

the controller comprising a flow program to communicate the opening and closure of the A valve and the B valve based on the occurrence of one or more events;

the flow program comprising a first mode (closed) wherein the A valve and the B valves are closed thereby shutting in a well, a second mode (open) wherein the A valve is opened to allow accumulated fluids and plunger lift equipment to travel up said well, said second mode having a plunger arrival detector to determine whether the A valve should be closed to allow pressure to build up in said well;

the flow program further comprising a third mode (EFM sales delay) that is triggered when a plunger arrival is detected, said third mode comprising a monitoring of one or more well parameters for a predetermined amount to time thereby delaying a sales time to determine whether said one or more well parameters trigger associated set points to warrant adjustments to said set points;

the flow program further comprising a fourth mode (sales) that is triggered after the predetermined amount of said third mode has expired whereby the A valve remains open to allow said well to produce for the amount of time designated for said fourth mode; and wherein the flow program returns to said first mode when said fourth mode has ended.

The present apparatus can provide a control system for controlling well flow of hydrocarbon production wells and making dynamic adjustments to one or more set points. The disclosed system allows an operator to remotely access, monitor, and control a well controller by means of a work station having a user interface such as a keypad display terminal and comprises a host server, a network and various data from the well controller. The workstation can be either connected directly to the host server or remote node connected to a Wide Area Network (WAN).

Although the disclosed device and method have been described with reference to disclosed embodiments, numerous modifications and variations can be made and still the result will come within the scope of the disclosure. No limitation with respect to the specific embodiments disclosed herein is intended or should be inferred.

We claim:

1. A system for dynamically controlling well flow from a well comprising:

a controller in electronic communication with a sales line valve and a vent line valve, said sales line valve capable of controlling flow to a product sales line, said vent line valve capable of controlling flow to a vent line;

the controller comprising a flow program to communicate the opening and closure of the sales line valve and the vent line valve based on the occurrence of one or more events;

the flow program comprising a first closed mode wherein the sales line valve and the vent line valve are closed thereby shutting in a well, a second open mode wherein the sales line valve is opened to allow accumulated fluids and plunger lift equipment to travel up said well, said second open mode having a plunger arrival detector to determine whether the sales line valve should be closed to allow pressure to build up in said well;

the flow program further comprising a third sales delay mode that is triggered when a plunger arrival is detected, said third sales delay mode comprising a monitoring of one or more well parameters for a predetermined amount to time thereby delaying a sales time to determine whether said one or more well parameters trigger associated set points to warrant adjustments to said set points;

the flow program further comprising a fourth sales mode that is triggered after the predetermined amount of said third EFM (Electric Flow Measurement) sales delay mode has expired whereby the sales line valve remains open to allow said well to produce for the amount of time designated for said fourth sales mode; and wherein the flow program returns to said first closed mode when said fourth sales mode has ended.

2. The system of claim 1, wherein said third sales delay mode comprises the making of adjustments to said set points prior to allowing sales to occur.

3. The system of claim 1, wherein the one or more monitored well parameters comprises plunger travel speed, flow rate and differential pressure.

4. The system of claim 1, wherein said second mode comprises a flow rate increase setting that can be used to simulate plunger or fluid arrival without the need for the installation of a plunger arrival sensor or a plunger lift system.

5. The system of claim 1, wherein said second mode comprises a tubing pressure increase setting that can be used to simulate plunger or fluid arrival without the need for the installation of a plunger arrival sensor or a plunger lift system.

6. The system of claim 1, wherein said controller is in electrical communication with a pneumatic device attachable to the sales line valve to monitor one or more separate flow control set points and control said sales line valve as commanded, thereby allowing for control of the incoming flow in a well and the speed of a traveling plunger.

7. The system of claim 1, wherein the third sales delay mode further comprises one or more opportunities to make adjustments to said set points.

8. The system of claim 7 further comprising a monitoring of a target open flow rate and comparing whether a fluid load was met.

9. The system of claim 7 further comprising a monitoring of a plunger travel speed and determining whether to classify said speed as fast, normal or slow.

10. A method for dynamically controlling well flow from a well, the steps of the method comprising:

providing a controller in electronic communication with a sales line valve and a vent line valve, said sales line valve capable of controlling flow to a product sales line, said vent line valve capable of controlling flow to a vent line;

the controller comprising a flow program to communicate the opening and closure of the sales line valve and the vent line valve based on the occurrence of one or more events;

the flow program comprising a first closed mode wherein the sales line valve and the vent line valve are closed thereby shutting in a well, a second open mode wherein the A valve is opened to allow accumulated fluids and plunger lift equipment to travel up said well, said second open mode having a plunger arrival detector to determine whether the sales line valve should be closed to allow pressure to build up in said well;

the flow program further comprising a third sales delay mode that is triggered when a plunger arrival is detected, said third sales delay mode comprising a monitoring of one or more well parameters for a predetermined amount to time thereby delaying a sales time to determine whether said one or more well parameters trigger associated set points to warrant adjustments to said set points;

the flow program further complising a fourth sales mode that is triggered after the predetermined amount of said third mode has expired whereby the sales line valve remains open to allow said well to produce for the amount of time designated for said fourth sales mode; and wherein the flow program returns to said first closed mode when said fourth sales mode has ended.

\* \* \* \* \*